(12) United States Patent
Ohno et al.

(10) Patent No.: US 7,209,484 B2
(45) Date of Patent: Apr. 24, 2007

(54) GATEWAY APPARATUS, ADDRESS ADMINISTRATION METHOD, AND AUDIO-VIDEO APPARATUS HAVING GATEWAY FUNCTION

(75) Inventors: Chiyo Ohno, Fujisawa (JP); Yoshimichi Kudo, Fujisawa (JP); Shigeto Oeda, Fujisawa (JP); Mayuko Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1071 days.

(21) Appl. No.: 10/199,709

(22) Filed: Jul. 19, 2002

(65) Prior Publication Data

US 2003/0161332 A1 Aug. 28, 2003

(30) Foreign Application Priority Data

Feb. 27, 2002 (JP) ............... 2002-050668

(51) Int. Cl.
*H04L 12/28* (2006.01)
*H04L 12/56* (2006.01)

(52) U.S. Cl. .................. 370/401; 370/389; 370/352; 709/245; 709/232

(58) Field of Classification Search ............... 370/394, 370/392, 250, 389, 352, 401; 709/245, 225, 709/232, 236
See application file for complete search history.

(56) References Cited

U.S. PATENT DOCUMENTS

| 5,724,510 | A | * | 3/1998 | Arndt et al. | ................ | 709/220 |
| 6,925,079 | B2 | * | 8/2005 | Matsukawa | ................ | 370/389 |
| 6,957,275 | B1 | * | 10/2005 | Sekiguchi | ................ | 709/245 |
| 7,068,651 | B2 | * | 6/2006 | Schmidt et al. | ............. | 370/389 |
| 2003/0118002 | A1 | * | 6/2003 | Bradd et al. | ................ | 370/352 |

FOREIGN PATENT DOCUMENTS

JP 2001-202317 7/2001

\* cited by examiner

*Primary Examiner*—Huy D. Vu
*Assistant Examiner*—Chuong Ho
(74) *Attorney, Agent, or Firm*—Townsend and Townsend and Crew LLP

(57) ABSTRACT

In a system having two or more gateway apparatuses connected to both first and second networks having mutually different address systems, a gateway apparatus is provided with a translation table for associating IP addresses with node IDs. The gateway apparatus inquires other gateway apparatuses whether other gateway apparatuses are administering the same address as an IP address generated for a newly added device. If there is another gateway apparatus that is administering the same address, the IP address is prevented from being registered in the translation table.

22 Claims, 20 Drawing Sheets

FLOW CHART OF ADDRESS TRANSLATION TABLE UPDATE (FIRST)

ONE CONFIGURATION EXAMPLE OF NETWORK SYSTEM

CONFIGURATION OF IPv6 ADDRESS

BLOCK CONFIGURATION EXAMPLE OF STB 110

ONE CONFIGURATION EXAMPLE OF ADDRESS TRANSLATION TABLE ADMINISTERED BY STB 110

FIG. 6

ONE CONFIGURATION EXAMPLE OF ADDRESS
TRANSLATION TABLE ADMINISTERED BY PC 120

| IPv6 ADDRESS (128bit) | Node Unique ID (64bit) | Node ID | |
|---|---|---|---|
| XXXX:0:0:0:0200:1212:3434:5656 | 0000 1212 3434 5656 | 0 | - |
| XXXX:0:0:0:0200:7878:9a9a:bcbc | 0000 7878 9a9a bcbc | 1 | - |
| XXXX:0:0:0:0213:579b:df24:68ac | 0013 579b df24 68ac | 2 | me |
| ...... | ...... | ...... | ...... |

610 — 620 — 630 — 640

600

601 (DTV121)
602 (VCR122)
603 (PC120)

DUPLICATION OF IPv6 ADDRESS

FLOW CHART OF ADDRESS TRANSLATION TABLE UPDATE (FIRST)

EXAMPLE OF WARNING FOR NOTIFYING IP ADDRESS DUPLICATION

FLOW CHART OF DUPLICATION CHECK OF IP ADDRESS (THIRD)

FLOW CHART OF ADDRESS TRANSLATION TABLE UPDATE (FOURTH)

FLOW CHART OF ADDRESS TRANSLATION TABLE UPDATE (SIXTH)

GATEWAY APPARATUS, ADDRESS ADMINISTRATION METHOD, AND AUDIO-VIDEO APPARATUS HAVING GATEWAY FUNCTION

BACKGROUND OF THE INVENTION

The present invention relates to a gateway apparatus and its address administration method whereby different networks of two kinds can be connected and devices on the networks can be assigned unique addresses. In particular, the present invention relates to gateway apparatuses whereby when devices of networks each including a gateway apparatus are connected, addresses can be assigned so as to avoid duplication between two gateway apparatuses.

In recent years, digitization of AV (audio-visual) devices represented by TVs and VTRs have been promoted. Digital satellite broadcast receivers, i.e., set top boxes (hereafter abbreviated to STBs), video cassette recorders (VCRs), video cameras and hard disks using a digital recording system, and recording apparatuses using an optical disk such as a DVD-RAM have made their appearance. Among these AV devices, there are increasing devices that adopt an IEEE 1394 serial bus (hereafter referred to as 1394 bus), whereby fast data communication of high quality can be conducted in connection with another AV device. The 1394 bus has a data transfer rate of a maximum 400 Mbps and an isochronous transfer mode whereby video and audio data can be transmitted in real time. In addition, the 1394 bus has an advantage that the user's operation can be reduced because insertion and removal of a cable are detected and a node ID having 16 bits is automatically assigned to each device. Therefore, attention has been paid to the 1394 bus as a standard interface of digital AV devices. Hereafter, an AV network using the 1394 bus is referred to as 1394 network.

On the other hand, in-home network construction has begun as well as a result of spread of information devices represented by PCs (Personal Computers) and the Internet. As one form of in-home networks, there can be mentioned an information system network that aims at sharing internet access and a printer among a plurality of PCs, such as notebook computers used by individuals and a desktop PC shared by family members. On this network, TCP/IP utilized on the Internet as a protocol is typically used, and an address called IP address is used to identify each device. At the present time, a version called IPv4 using a 32-bit address is the mainstream. In recent years, however, a new version expanded in address to 128 bits and called IPv6 (Internet Protocol version 6) has been drawn up.

As shown in FIG. 2, an IPv6 address 200 includes a network prefix 201 represented by 64 high-order bits thereof and an interface ID 202 represented by 64 low-order bits thereof. The network prefix 201 is used as an identifier of a connected network. A value notified of by a router by utilizing an automatic stateless address autoconfiguration function is set in the network prefix 201. The interface ID 202 is used as an identifier of a device that exists on the network. In the case of a LAN using a twist pair line, the interface ID 202 is set on the basis of a 48-bit MAC address. In the case of a 1394 bus, the interface ID 202 is set on the basis of a node unique ID (hereafter abbreviated to unique ID) having 64 bits. Hereafter, an information system network using the TCP/IP is referred to as IP network.

For exchanging data directly between a device on the IP network and a device on the 1394 network, a gateway apparatus having both interfaces in order to connect the two networks becomes necessary.

In JP-2001-202317, there is described a method of controlling a digital AV device or the like connected to a 1394 bus via such a gateway apparatus, by using a controller on the IP network.

According to the above described conventional technique, one gateway apparatus, which forms the nucleus in the home, has an address translation table that associates IP addresses and unique IDs previously provided to devices on the 1394 network with each other, and transmits data received from the IP network or the Internet to a device on the 1394 network on the basis of the address translation table.

In a system configuration in which two or more gateway apparatuses exist on an IP network and a 1394 network exists for each of the gateway apparatuses, a user connects a device on a 1394 network to a device on a different 1384 network by using a 1394 bus. Such a situation is conceivable. In this case, it turns out that devices that have existed on different 1394 networks exist on one 1394 network. User's operation of updating contents of address translation tables administered by the two gateway apparatuses so as not to cause duplication becomes necessary. Even in the case where the gateway apparatuses automatically update the address translation tables, a mechanism for preventing duplication of contents of address translation tables among a plurality of gateway apparatuses becomes necessary.

SUMMARY OF THE INVENTION

Assuming now that in a system having two or more gateway apparatuses each connected to both an IP network and a 1394 network a device on a 1394 network is connected to a device on a different 1394 network via a 1394 bus, an object of the present invention is to provide a gateway apparatus, its address administration method, and an AV device having a gateway function that can easily prevent duplication of IP addresses administered by gateway apparatuses and duplication of a path for each device on the 1394 bus.

In accordance with the present invention, the object is achieved by providing a gateway apparatus connected to both an IP network and a 1394 network with the following means:

(1) means for conducting data communication with a device on the IP network;

(2) means for conducting data communication with a device on the 1394 network;

(3) means for automatically generating an IP address of each of devices existing on the 1394 network on the basis of a unique ID, which is an identifier for identifying an individual device;

(4) means for generating and storing an address translation table, which associates the IP address generated by the means (3) to the node ID;

(5) means for updating contents of the address translation table generated and stored by the means (4);

(6) means for effecting a check to determine whether there is duplication of the IP address generated by the means (3);

(7) means for setting as to whether the address translation table generated and stored by the means (4) can be used;

(8) means for notifying that there is duplication of the IP address generated by the means (3);

(9) means for acquiring a unique ID or a node ID of another gateway apparatus via the means (1); and

(10) means for storing the unique ID or the node ID of another gateway apparatus acquired by the means (9).

A first example of operation of the gateway apparatus conducted when devices on different 1394 networks are connected to each other and a bus reset is generated will now be described.

I. When occurrence of a bus reset is detected, unique IDs and node IDs of devices existing on the 1394 network are acquired by using the means (2).

II. Information of the devices acquired in I is compared with contents of the address translation table administered by using the means (4).

III. If as a result of the comparison of II there is a removed device, information of the device is deleted from the address translation table by using the means (5).

IV. If as a result of the comparison of II there is an added device, an IP address of the device is generated by using the means (3).

V. A check is effected to determine whether there is duplication between the IP address generated in III and addresses administered by other gateway apparatuses, by using the means (1) and (6).

VI. If as a result of the check in V notice of duplication is not given from other gateway apparatuses for a certain fixed period, then the IP address generated in III is stored in the address translation table by using the means (5).

VII. If as a result of the check in V notice of duplication is given from any of other gateway apparatuses, then the IP address generated in III is not stored in the address translation table. At that time, the user is notified that there is duplication of the IP address, by using the means (8).

A second example of operation of the gateway apparatus will now be described.

I. When occurrence of a bus reset is detected, unique IDs and node IDs of devices existing on the 1394 network are acquired by using the means (2).

II. A check is effected to determine whether the current address translation table can be used, by using the means (7).

III. If it is found by the check in II that the current address translation table is set invalid, then the current address translation table is set valid by using the means (7).

IV. If it is found by the check in II that the current address translation table is set valid, then information of the devices acquired in I is compared with contents of the address translation table administered by using the means (4).

V. If as a result of the comparison of IV there is a removed device, information of the device is deleted from the address translation table by using the means (5). If as a result of the comparison of IV there is an added device, an IP address of the device is generated by using the means (3).

VI. A check is effected to determine whether there is duplication between the IP address generated in V and addresses administered by other gateway apparatuses, by using the means (1) and (6).

VII. If as a result of the check in (6) notice of duplication is not given from other gateway apparatuses for a certain fixed period, then the IP address generated in V is stored in the address translation table by using the means (5).

VIII. If as a result of the check in VI notice of duplication is given from any of other gateway apparatuses, then the address translation table is set invalid by using the means (7).

A third example of operation of the gateway apparatus will now be described.

I. When occurrence of a bus reset is detected, unique IDs and node IDs of devices existing on the 1394 network are acquired by using the means (2).

II. A check is effected to determine whether the current address translation table can be used, by using the means (7).

III. If it is found by the check in II that the current address translation table is set invalid, then it is ascertained by using the means (10) whether a gateway apparatus that existed before the bus reset exists. If the gateway apparatus that existed before the bus reset does not exist, then the address translation table is set valid by using the means (7). If the gateway apparatus that existed before the bus reset exists, then the processing is finished.

IV. If it is found by the check in II that the address translation table is set valid, then information of the devices acquired in I is compared with contents of the address translation table administered by using the means (4).

V. If as a result of the comparison of IV there is a removed device, information of the device is deleted from the address translation table by using the means (5). If as a result of the comparison of IV there is an added device, an IP address of the device is generated by using the means (3).

VI. A check is effected to determine whether there is duplication between the IP address generated in V and addresses administered by other gateway apparatuses, by using the means (1) and (6).

VII. If as a result of the check in VI notice of duplication is not given from other gateway apparatuses for a certain fixed period, then the IP address generated in V is stored in the address translation table by using the means (5).

VIII. If as a result of the check in VI notice of duplication is given from any of other gateway apparatuses, then a unique ID of the gateway apparatus is acquired by using the means (9), and a check is effected to determine whether the unique ID is the same as a unique ID of the IP address generated in V.

IX. If as a result of the check in VIII the unique IDs are equal, then the unique ID is not stored in the address translation table.

X. If as a result of the check in VIII the unique IDs are different from each other, then the address translation table is set invalid by using the means (7). And the unique ID of the gateway apparatus is stored by using the means (10).

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing a configuration example of an address translation table administered by means of PC, which is a domain GW, according to an embodiment of the present invention;

DESCRIPTION OF THE EMBODIMENTS

Figure 1:
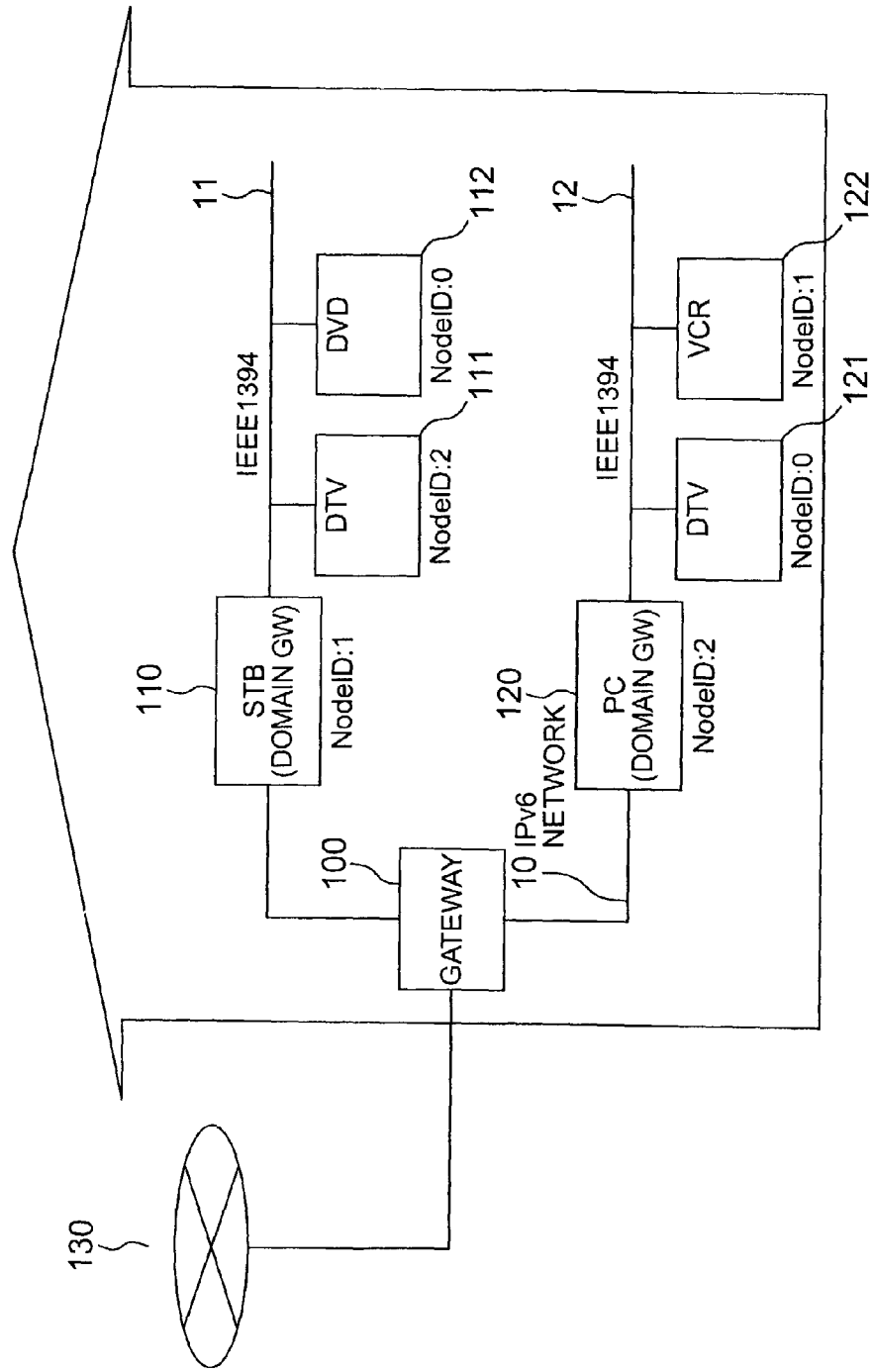
FIG. 1 is a diagram showing a configuration example of a network system according to an embodiment of the present invention.

An embodiment of the present invention will now be described by referring to FIG. 1. FIG. 1 shows a system configuration of a network in home using gateway apparatuses according to an embodiment of the present invention.

In FIG. 1, an STB 110 and a PC 120 are gateway apparatuses in the present invention. The STB 110 and the PC 120 couple networks of digital AV devices using 1394 buses to an IP network using a wire/radio LAN.

A DTV 111 and a DVD recorder 112 are connected to a 1394 bus 11 connected to the STB 110. In the same way, a DTV 121 and a VCR 122 are connected to a 1394 bus 12 connected to the PC 120.

A gateway 100 connects the home to the outside. The gateway 100, the STB 110 and the PC 120 are connected to the wire/radio LAN.

The gateway 100 has a router function for coupling networks in the home to a wide area network, and a wide area network access function, such as an ADSL modem function or a cable modem function. The gateway 100 is connected to Internet 130. The gateway 100 need not include a router and a modem united in a body, but the router and the modem may be provided as separate apparatuses. Furthermore, the gateway function may be incorporated in an AV device such as the STB or the DTV. Or the gateway function may be incorporated in the PC. Or the gateway function may be incorporated in the PC in the form of a board or a card.

Figure 3:
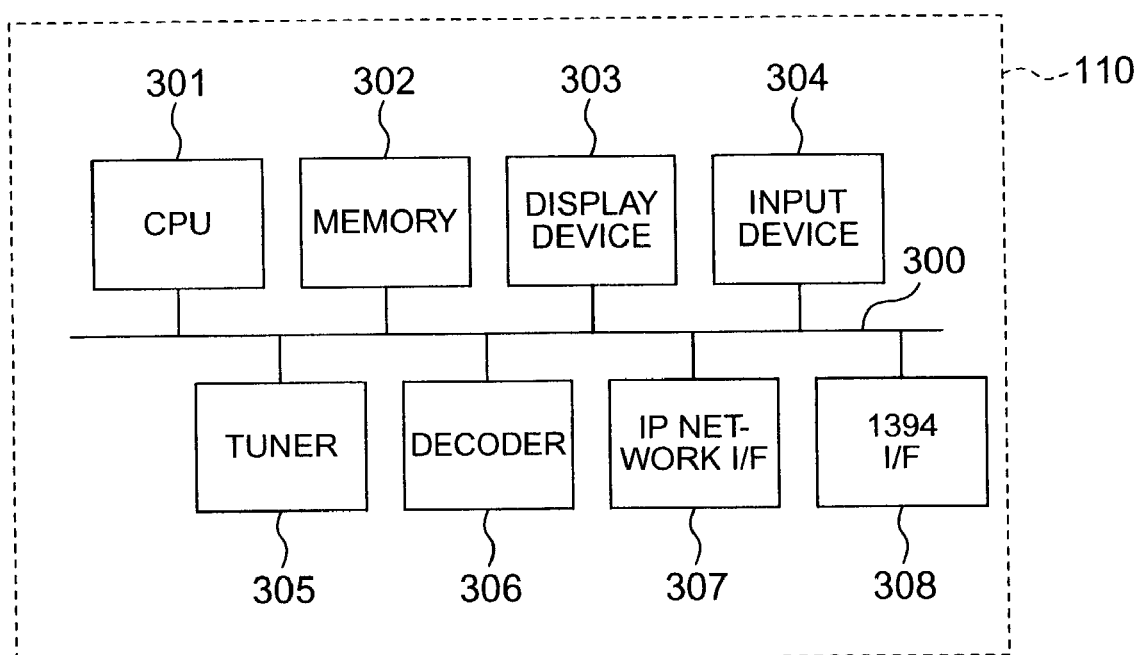
FIG. 3 is a diagram showing an example of a block configuration of STB, which is a domain GW, according to an embodiment of the present invention.

FIG. 3 is a block diagram showing an example of a detailed configuration of the STB 110.

A CPU 301, which conducts the whole control, is connected to a memory 302, a display device 303, an input device 304, a tuner 305, a decoder 306, an IP network I/F 307, and an 1394I/F 308 via a system bus 300.

The display device 303 is a display such as an LCD or a liquid crystal panel. The display device 303 displays an operation state and a message for a user.

The input device 304 is input means such as a remote controller or a touch panel. The input device 304 is utilized by the user to operate the STB 110.

As for a signal received from an antenna, a desired program is selected by the tuner 305, and restored to a video and audio signal by the decoder 306.

The IP network I/F 307 receives data sent from an IPv6 network, or sends out response data.

The 1394I/F 308 is connected to an AV device such as as the DTV 111 via the 1394 bus. The 1394I/F 308 transmits a control command to each AV device or receives an operation state of each device under a command given by the CPU 301. Furthermore, the 1394I/F 308 receives video and audio data sent from each AV device, and sends it to the decoder 306 to reproduce the video signal. Furthermore, the 1394I/F 308 sends out video and audio data output from the tuner 305 to the 1394 bus in order to record it.

Figure 4:
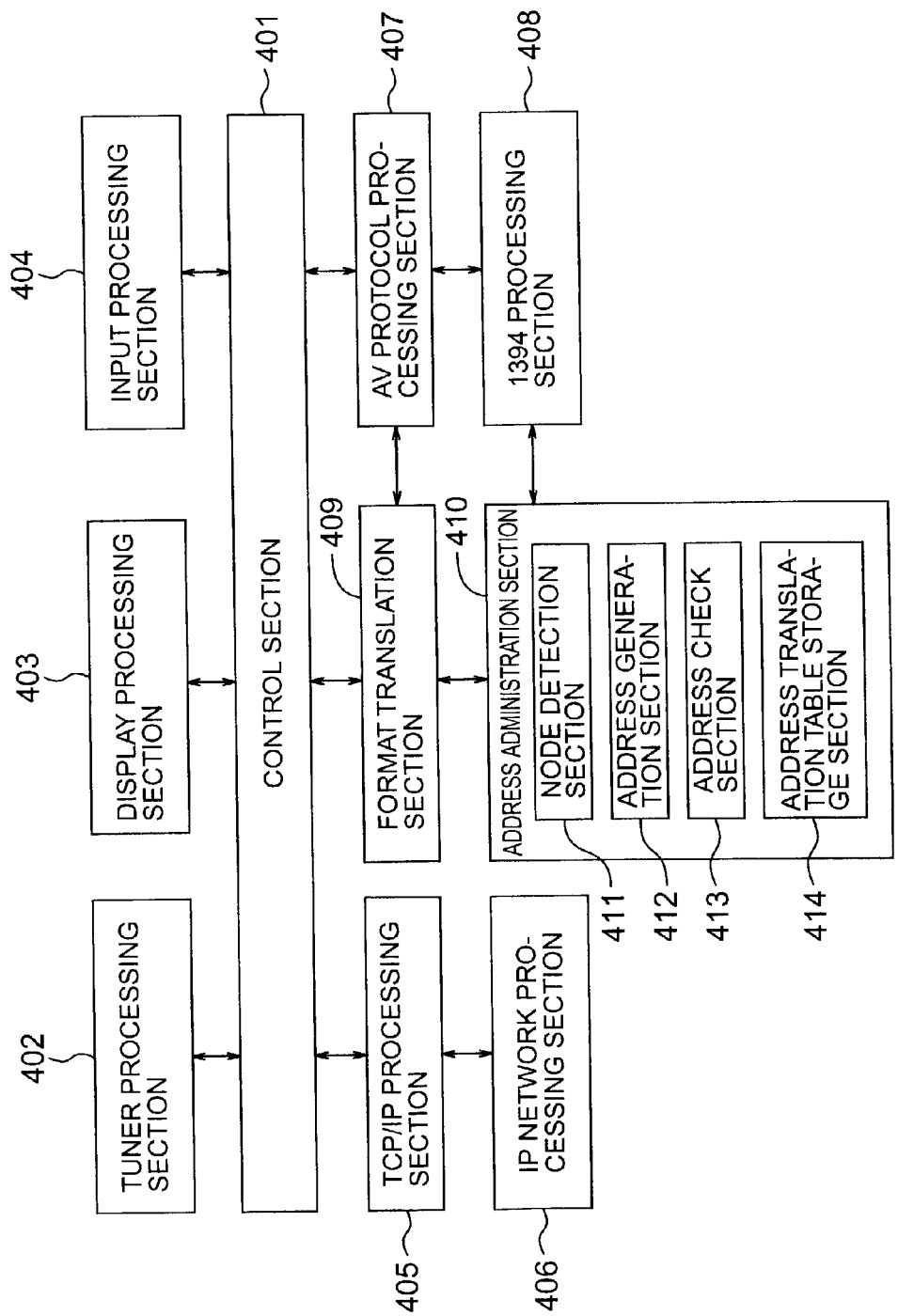
FIG. 4 is a diagram showing an example of a software configuration of STB, which is a domain GW, according to an embodiment of the present invention.

FIG. 4 shows a configuration of software that operates in the CPU 301 included in the STB 110.

The software includes a control section 401, a tuner processing section 402, a display processing section 403, an input processing section 404, a TCP/IP processing section 405, an IP network processing section 406, an AV protocol processing section 407, an 1394 processing section 408, a format translation section 409, and an address administration section 410. The control section 401 controls the whole system.

The tuner processing section 402 controls original functions of the receiver, such as reception, station selection and decoding of broadcast.

The display processing section 403 executes display of a device operation state and a message to a user.

The input processing section 404 analyzes contents of user's operation supplied from the input device 304, and notifies the control section of a result of the analysis.

The IP network processing section 406 delivers data received from the IP network to the TCP/IP processing section 406 to find out an IP address and a port number of data transmission destination. And it is determined whether the data transmission destination is a device on the 1394 network or the own device. In the case of the own device, the IP network processing section 406 notifies the control section 401 of the contents. In the case of a device on the 1394 network, the IP network processing section 406 sends data to the format translation section 409 to translate the data in format to a packet form to be used on the 1394 bus. Thereafter, the IP network processing section 406 sends translated data to the AV protocol processing section 407, and transmits the translated data onto the 1394 bus via the 1394 processing section 408.

The 1394 processing section 408 delivers data received from the 1394 network to the AV protocol processing section 407. It is determined whether the data is a response to data sent from the IP network or data destined to the own device. According to a result thereof, the data is sent to the control section 401 or the format translation section 409. The data sent to the format translation section 409 is sent further to the TCP/IP processing section 405, and sent out onto the IP network via the IP network processing section 406.

The address administration section 410 includes a node detection section 411, an address generation section 412, an address check section 413 and an address translation table storage section 414.

If a new device is connected to the 1394 network or a device connected to the 1394 network is removed, the node detection section 411 acquires information, such as unique IDs and node IDs, of currently connected devices via the 1394 processing section 408.

The address generation section 412 automatically generates an IP address on the basis of the unique IDs acquired by the node detection section 411.

The address check section 413 effects a check to determine whether the IP address generated by the address generation section 412 is already administered by another gateway apparatus.

The address translation table storage section 414 holds an address translation table, which indicates association relations among IP addresses, unique IDs, and node IDs created by the address generation section 412. The translation table is referred to by the TCP/IP processing section 405 in order to determine whether the received data is destined to a device on the 1394 network. And the translation table is referred to by the format translation section 409 in order to translate the IP address and the node ID of the data transmission source or destination.

The configuration of the STB 110 has been described with reference to FIGS. 3 and 4. The PC 120 also has an equivalent configuration except a function specific to a device such as the tuner 305. Furthermore, the STB 110 has been described as an example of an AV device having the gateway function. However, the gateway function may be incorporated in another AV device such as a DTV. Or the gateway function may be incorporated in the PC. Or the gateway function may be incorporated in the PC in the form of a board or a card. Or the gateway function may be independent as a gateway apparatus.

Figure 5:
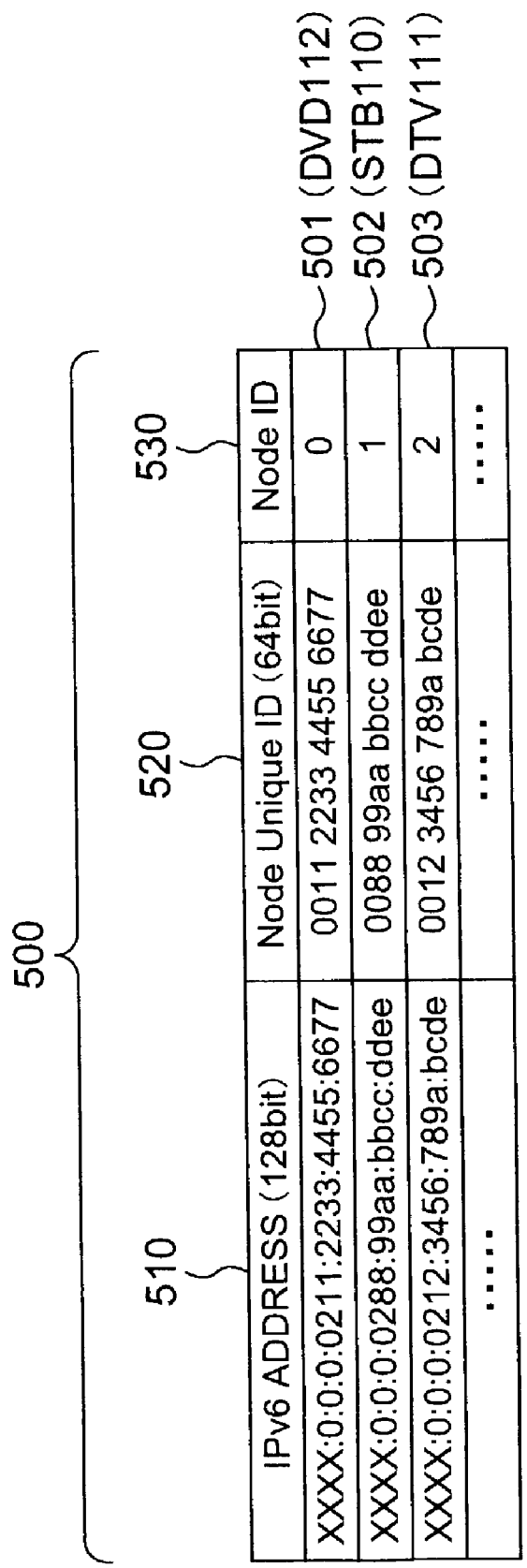
FIG. 5 is a diagram showing a configuration example of an address translation table administered by means of STB, which is a domain GW, according to an embodiment of the present invention.

FIG. 5 shows an example of data contents of the address translation table held by the address translation table storage section 414 in the STB 110.

Figure 2:
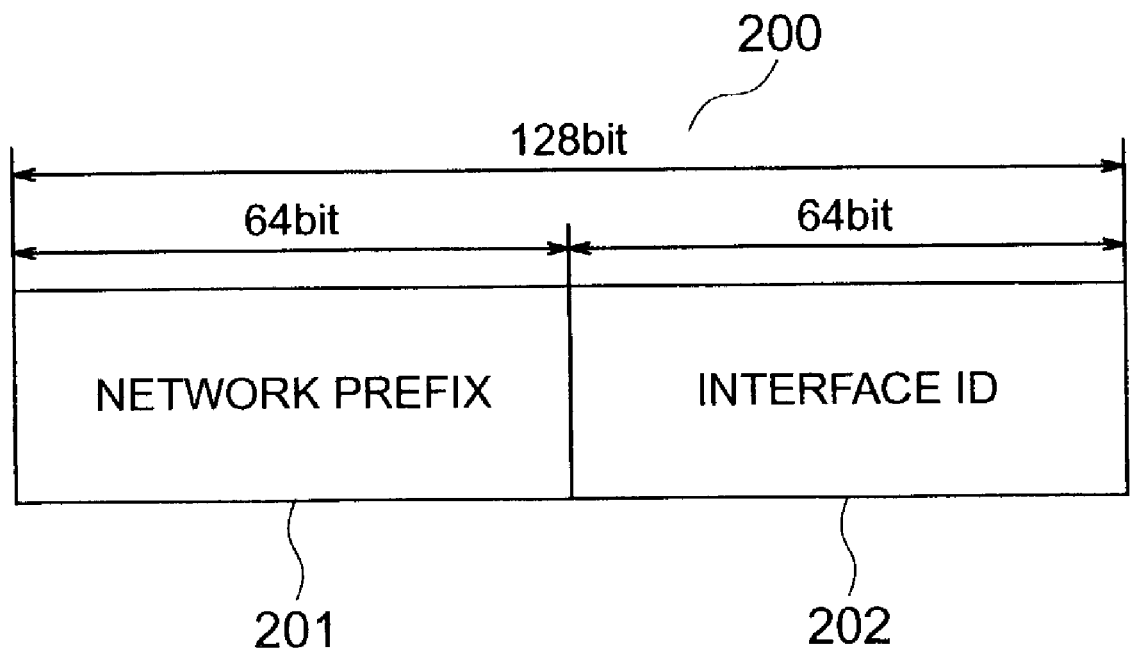
FIG. 2 is a diagram showing a configuration of an IPv6 address according to an embodiment of the present invention.

The address translation table 500 indicates an association relation among an IP address 510, a unique ID 520, and a node ID 530 of each of devices connected to the 1394 network. In FIG. 5, an example in the case where the IPv6 is used as the IP address is shown. As shown in FIG. 2, the 128-bit IP address 510 includes the 64-bit network prefix and the 64-bit interface ID. The unique ID 520 is a unique identification number assigned to each of devices corresponding to the 1394IF at the time of manufacture. The unique ID 520 includes a manufacturer ID represented by higher 24 bits and a device ID represented by lower 40 bits. The node ID 530 is an identification number dynamically assigned to each of devices. If a device is newly added onto or removed from the 1394 network, a bus reset is generated and conveyed to respective devices and node IDs are automatically assigned to respective devices.

The address translation table 500 includes address information 501 concerning the DVD recorder 112 as a device on the 1394 network connected to the STB 110, address information 502 of the STB 110 itself, and address information 503 concerning the DTV 111.

In the same way, FIG. 6 shows an example of data contents of the address translation table held by the address translation table storage section 414 in the PC 120.

The address translation table 600 includes an own node flag 640 indicating which is the own device, besides an association relation among an IP address 610, a unique ID 620, and a node ID 630 of each of devices connected to the 1394 network. Details of each data are similar to those of FIG. 5.

The address translation table 600 includes address information 601 concerning the DTV 121 as a device on the 1394 network connected to the PC 120, address information 602 of the VTR 122, and address information 603 of the PC 120 itself. Each of the address translation tables 500 and 600 respectively of FIGS. 5 and 6 has a configuration that also includes information concerning the own device, but may have a configuration that does not include the own device.

Each of the STB 110 and PC 120 has a function of being connected to both the IP network and the 1394 network, and consequently has two kinds as the IP address of the own device. The two kinds are an IP address based on the MAC address of the wire/radio LAN (hereafter referred to as MAC-IP address) and an IP address based on the unique ID of the 1394 IF. The IP address handled by the address translation tables 500 and 600 is the latter IP address.

Figure 7:
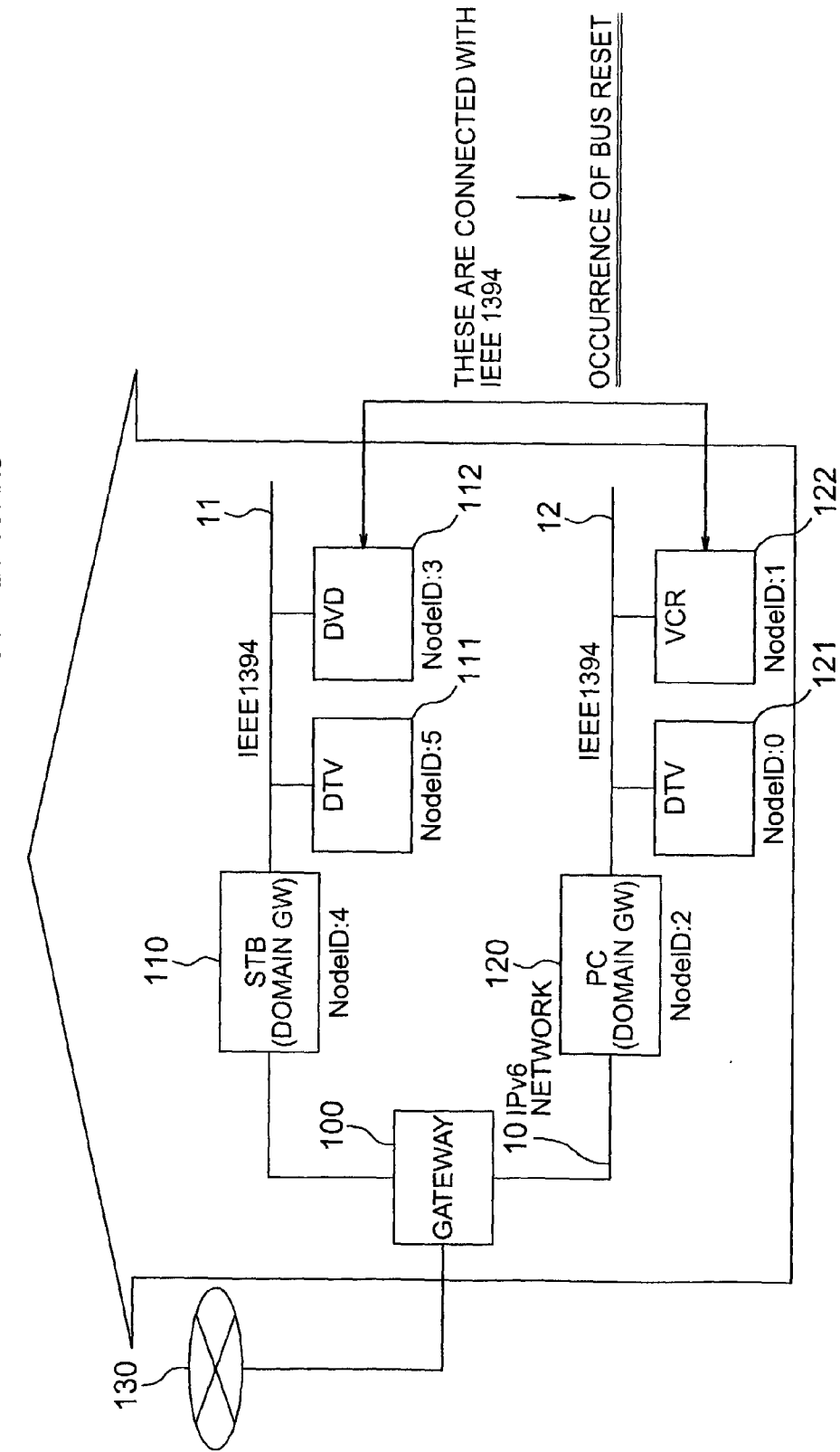
FIG. 7 is a diagram showing a system configuration example that indicates that devices on subnetworks have been connected, according to an embodiment of the present invention.

It is now assumed that in the system having the configuration heretofore described the user connects the DVD recorder 112 existing on the 1394 network of the STB 110 side to the VTR 122 existing on the 1394 network of the PC 120 side by using the 1394 bus as shown in FIG. 7.

Figure 8:
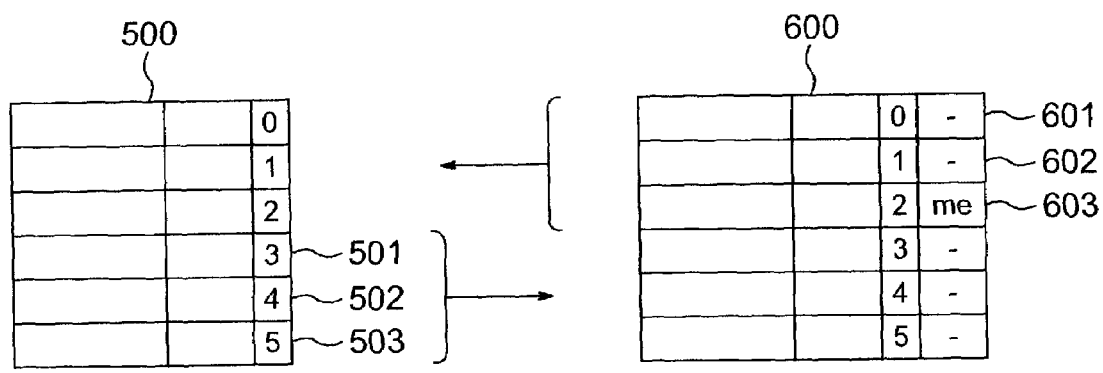
FIG. 8 is a diagram showing that domain GWs assign IPv6 addresses in duplication, according to an embodiment of the present invention.

In this case, a bus reset is generated because the device configuration is altered, as described above. Two 1394 networks become one 1394 network and node IDs are newly assigned to respective devices. Thereupon, address duplication occurs between contents of the address translation table 500 administered on the STB 110 side and contents of the contents of the address translation table 600 administered on the PC 120 side as shown in FIG. 8. Therefore, there can occur problems such as a collision between data transmitted to devices on the 1394 network or communication of useless packets caused by duplication of a path.

Hereafter, methods for avoiding the problem will be described.

Figure 9:
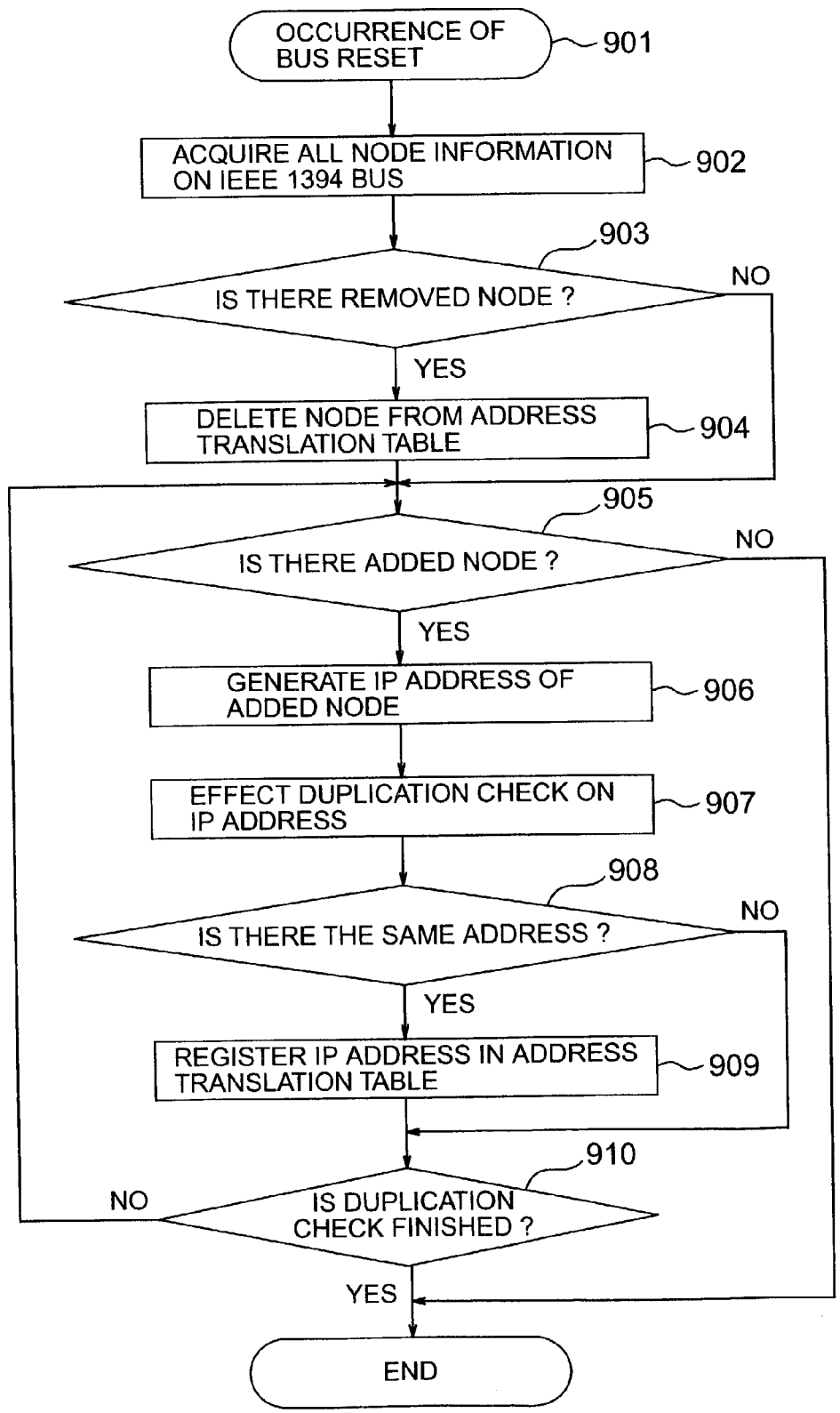
FIG. 9 is a sequence diagram showing a procedure whereby a domain GW assigns an IP address to a device on a 1394 bus, according to an embodiment of the present invention.

As a first method, an update procedure of an address translation table in a gateway apparatus is shown in FIG. 9. As an example, operation of the STB 110 will now be described.

First, if devices on two different 1394 networks are connected to each other, a bus reset is generated (step 901). The node detection section 411 in the STB 110 acquires node IDs and unique IDs of all devices on the 1394 network via the 1394 processing section 408, and notifies the address check section 413 of their association (step 902). The address check section 413 reads out the address translation table 500 from the address translation table storage section 414, compares contents of the notice with contents of the address translation table 500, and first effects a check to determine whether there is a device removed from the 1394 network (step 903). Only in the case where a removed device exists as a result, the address check section 413 deletes address information for the device from the address translation table 500 (step 904).

Subsequently, the address check section 413 effects a check to determine whether there is a device newly added to the 1394 network (step 905). If as a result there is a newly added device (for example, the DTV 121), the address check section 413 notifies the address generation section 412 of a 64-bit unique ID (0000:1212:3434:5656) of that device. The address generation section 412 writes "1" in a seventh most significant bit of the unique ID in order to indicate that the ID is an ID to be used locally, and use it as an interface ID 202 of the IP address of that device. Furthermore, the address generation section 412 writes a value of 64 bits (XXXX:0:0:0) supplied from a router on the IP network, and generates an IP address of a total of 128 bits (XXXX:0:0:0:0200:1212:3434:5656) (step 906). The address generation section 412 notifies the address check section 413 of the IP address. By utilizing the function of, for example, NDP (Neighbor Discovery Protocol), the address check section 413 conducts multi-cast transmission of a duplication confirmation message containing the generated IP address to devices on the IP network (step 907). If as a result a response to the message is returned from another device on the IP network, then the address check section 413 judges that there is duplication of the IP address (step 908), and the processing proceeds to generation of an IP address for the next added device. On the other hand, if there is no response to the message, then the address check section 413 judges that there is no duplication of the IP address, and the generated IP address, the unique ID, and the node ID are registered in the address translation table 500 (step 909). Thereafter, the operation of steps 905 to 909 is repeated as many times as the number of added devices.

Instead of deleting information concerning the removed device at the step 904, a method of making the information invalid by using a flag or the like may also be adopted.

Figure 10:
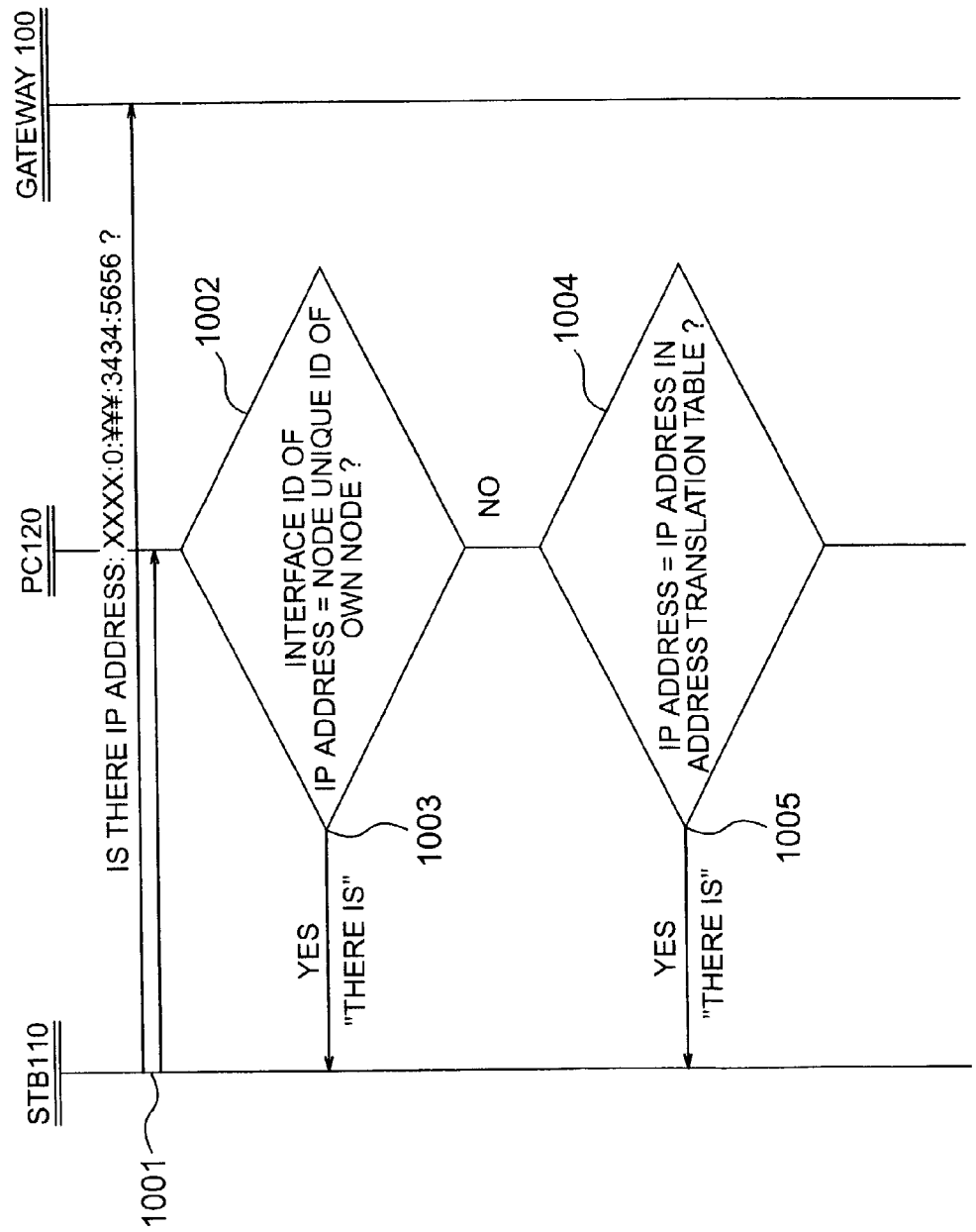
FIG. 10 is a sequence diagram showing a procedure whereby a domain GW effects a duplication check on an IP address, according to an embodiment of the present invention.

FIG. 10 shows a procedure whereby a device on the IP network responses to the message multi-cast at the step 907.

First, the STB 110 transmits a message containing the generated IP address to the PC 120 and the gateway 100 (step 1001). The PC 120 receives the message via the IP network processing section 406, and notifies the TCP/IP processing section 405 of contents of the message. The TCP/IP processing section 405 extracts lower 64 bits (for example, 0200:1212:3434:5656) of the received IP address, which represent the interface ID, and notifies the address check section 413 of the interface ID. The address check section 413 effects a check to determine whether the interface ID is equal to the own unique ID exclusive of the seventh most significant bit (step 1002). If as a result equality is found, then the TCP/IP processing section 405 is notified of the equality, and a return message for the message is generated and transmitted to the STB 110 via the IP network processing section 406 (step 1003). On the other hand, if the interface ID is not equal to the own unique ID, then the address translation table 600 is read out from the address translation table storage section 414, and a check is effected to determine whether device information having a unique ID equivalent to the interface ID exists in the address translation table 600 (step 1004). If as a result the equivalent unique ID exists in the address translation table 600, then notice to the effect is given to the TCP/IP processing section 405, and a return message for the message is generated and transmitted to the STB 110 via the IP network processing section 406 (step 1005). If the same unique ID does not exist in the address translation table 600, then nothing is conducted and the processing is finished.

There is a possibility that the STB 110 and the PC 120 simultaneously transmit messages containing the same IP address at the step 1001. Upon receiving the message in this case, each of the STB 110 and the PC 120 effects a check to determine whether itself has transmitted a message to a different device and is in the state of waiting for a response to the message. If it is in the state of waiting for a response, it conducts exclusive control such as returning notice to the effect that response cannot be conducted now, such as "busy." Upon receiving "busy," the device transmits the message again immediately or after a wait.

Even in the case where devices on two different 1394 networks have been connected to each other to form one 1394 network, the procedure described heretofore causes the STB 110 to have only address association of the DTV 111 and the DVD recorder 112 inclusive of the its own device in the address translation table 500 and the PC 120 to have only address association of the DTV 121 and the VTR 122 inclusive of the its own device in the address translation table 600. It is thus avoided to assign an IP address to devices on the 1394 network in duplication. Furthermore, if a new device other than the DTV 111, the DVD recorder 112, DTV 121 and the VTR 122 has been added, the STB 110 and the PC 120 execute a procedure similar to that described above. The STB 110 or the PC 120 that has conducted the IP address generation of that device and a duplication check conducts registration in the address translation table.

Figure 11:
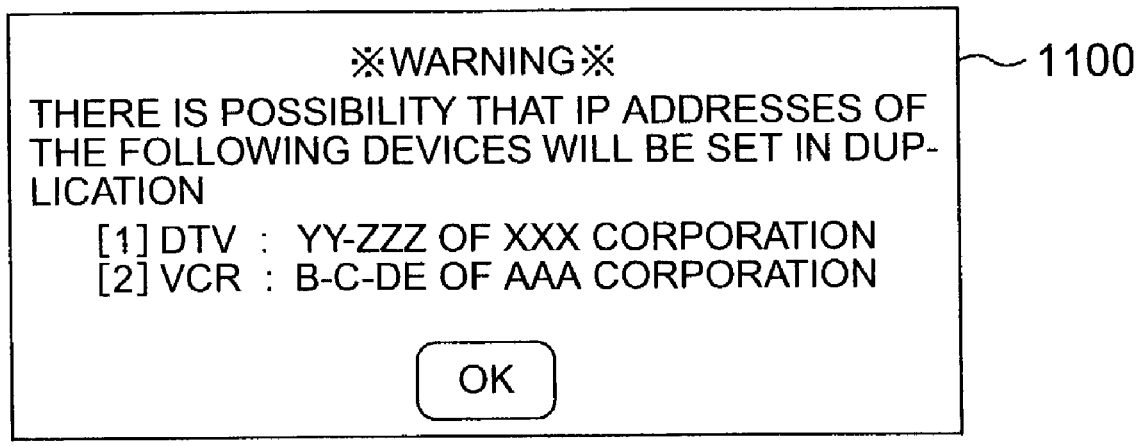
FIG. 11 is a diagram showing an example of a display screen whereby a domain GW notifies a user that devices on different subnetworks are connected to each other.

In the case where the same address exists at the step 908 of FIG. 9, means for given notice to the effect to the user is conceivable. FIG. 11 shows an alarm picture 1100 the STB 110 displays for the user by using the display processing section 403. There is a method of displaying the alarm picture 1100 and thereafter conducting the processing of the step 909 and subsequent processing in the same way as the foregoing description. Or there is also a method in which the user arbitrarily modifies the contents of the address translation table 500 of the STB 110 side and the contents of the address translation table 600 of the PC 120 side so as to avoid address duplication.

Figure 12:
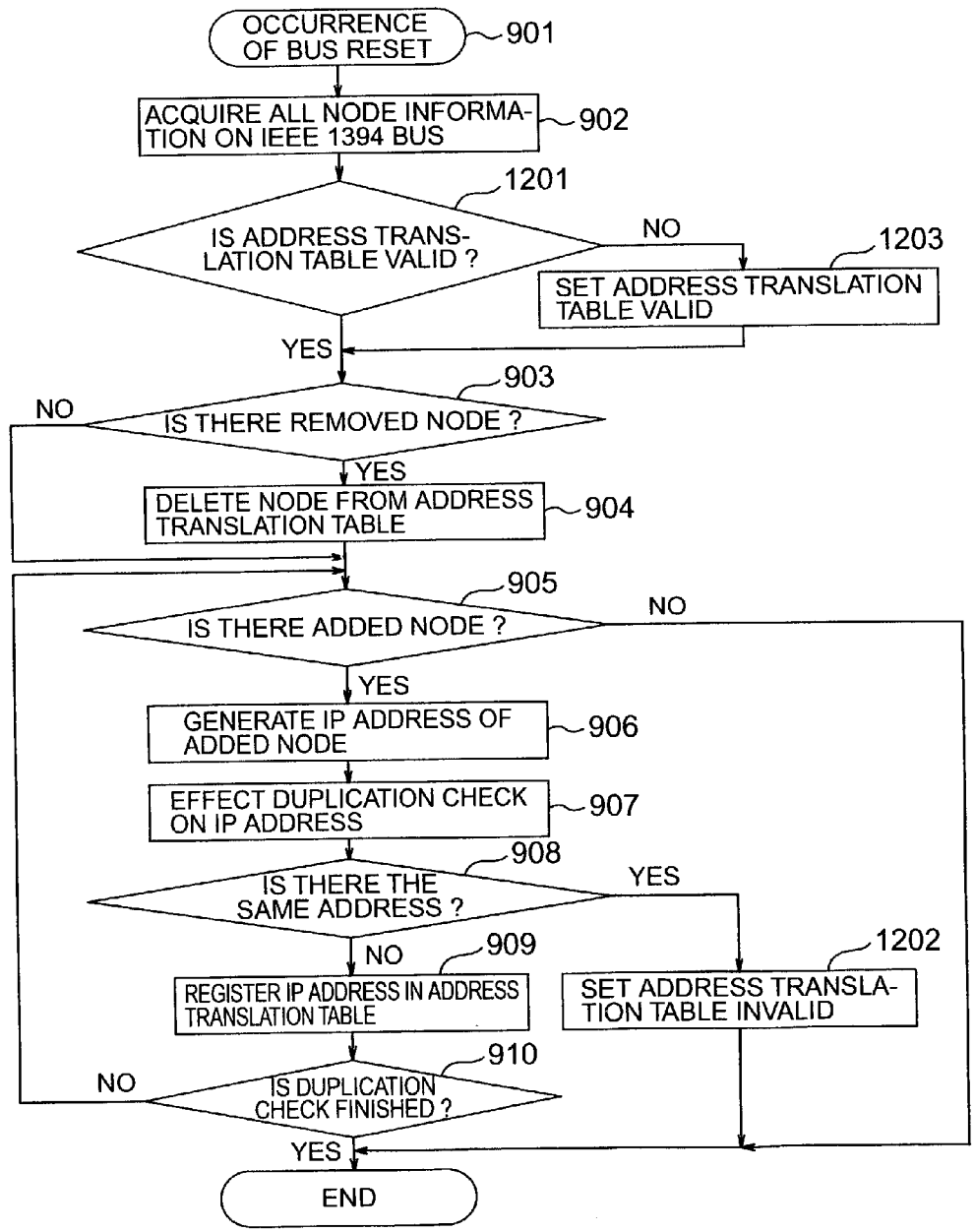
FIG. 12 is a sequence diagram showing a procedure whereby a domain GW assigns an IP address to a device on a 1394 bus, according to an embodiment of the present invention.

As a second method, an update procedure of the address translation table in the gateway apparatus is shown in FIG. 12. As an example, operation of the STB 110 will now be described.

First, if devices on two different 1394 networks are connected to each other, then a bus reset is generated (step 901). The node detection section 411 of the STB 110 acquires node IDs and unique IDs of all devices on the 1394 network via the 1394 processing section 408, and notifies the address check section 413 of association between them (step 902). The address check section 413 inquires of the address translation table storage section 414 whether the address translation table 500 is valid at the present time (step 1201). The address translation table storage section 414 notifies the address check section 413 whether setting of the address translation table 500 is valid at the present time. If setting of the address translation table 500 is valid, processing similar to the steps 903 to 908 of FIG. 9, which is the first method is conducted.

If the duplication confirmation message containing the IP address generated is multi-cast transmitted to devices on the IP network at the step 907 and consequently a response to that message is returned from another device on the IP network at the step 908, then the address check section 413 orders the address translation table storage section 414 to set the address translation table 500 invalid (step 1202), and the processing is finished. Upon sensing generation of a bus reset, the processing is started again from the step 901. At the step 1201, the address check section 413 effects a check to determine whether the address translation table 500 of the address translation table storage section 414 is valid at the present time. If as a result it is found that the address translation table 500 is set invalid, then the address check section 413 orders the address translation table storage section 414 to set the address translation table 500 valid (step 1203), and the processing of the step 903 and subsequent steps is conducted.

There is conceivable a method of generating a bus reset at the step 1202 so as to avoid an IP address setting omission in the address translation table 600 of another gateway apparatus (such as PC 120) on the IP network, and then finishing the processing. In this case, it is necessary to make the address translation table 500 valid at the step 1203 and thereafter finish the processing.

Figure 13:
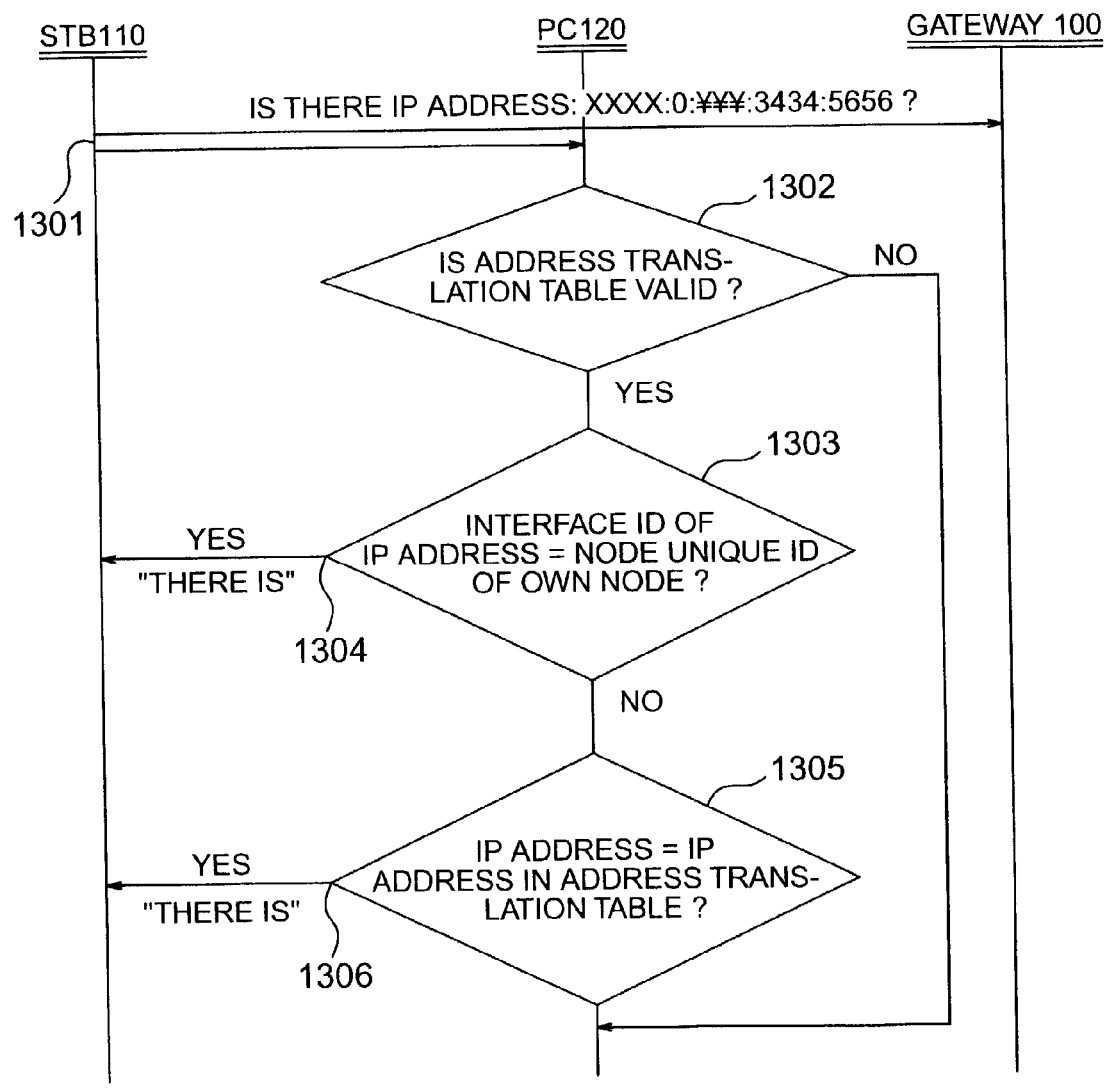
FIG. 13 is a sequence diagram showing a procedure whereby a domain GW effects a duplication check on an IP address, according to an embodiment of the present invention.

FIG. 13 shows a response procedure of a device on the IP network to the multi-cast message at the step 907.

First, the STB 110 transmits a message containing the generated IP address to the PC 120 and the gateway 100 (step 1301). The PC 120 receives the message via the IP network processing section 406, and notifies the TCP/IP processing section 405 of contents of the message. The TCP/IP processing section 405 extracts 64 low-order bits (for example, 0200:1212:3434:5656) of the received IP address, which represent the interface ID, and notifies the address check section 413 of the interface ID. The address check section 413 inquires of the address translation table storage section 414 whether the address translation table 500 is valid at the present time (step 1302). If the address translation table 500 is invalid, the processing is finished only when the address translation table 500 is valid, the address check section 413 effects a check to determine whether the interface ID is equal to the own unique ID exclusive of the seventh most significant bit (step 1303). If as a result equality is found, then the TCP/IP processing section 405 is notified of the equality, and a return message for the message is generated and transmitted to the STB 110 via the IP network processing section 406 (step 1304).

On the other hand, if the interface ID is not equal to the own unique ID, then the address translation table 600 is read out from the address translation table storage section 414, and a check is effected to determine whether device information having a unique ID equivalent to the interface ID exists in the address translation table 600 (step 1305). If as a result the equivalent unique ID exists in the address translation table 600, then notice to the effect is given to the TCP/IP processing section 405, and a return message for the message is generated and transmitted to the STB 110 via the IP network processing section 406 (step 1306). If the same unique ID does not exist in the address translation table 600, then nothing is conducted and the processing is finished.

Figure 14:
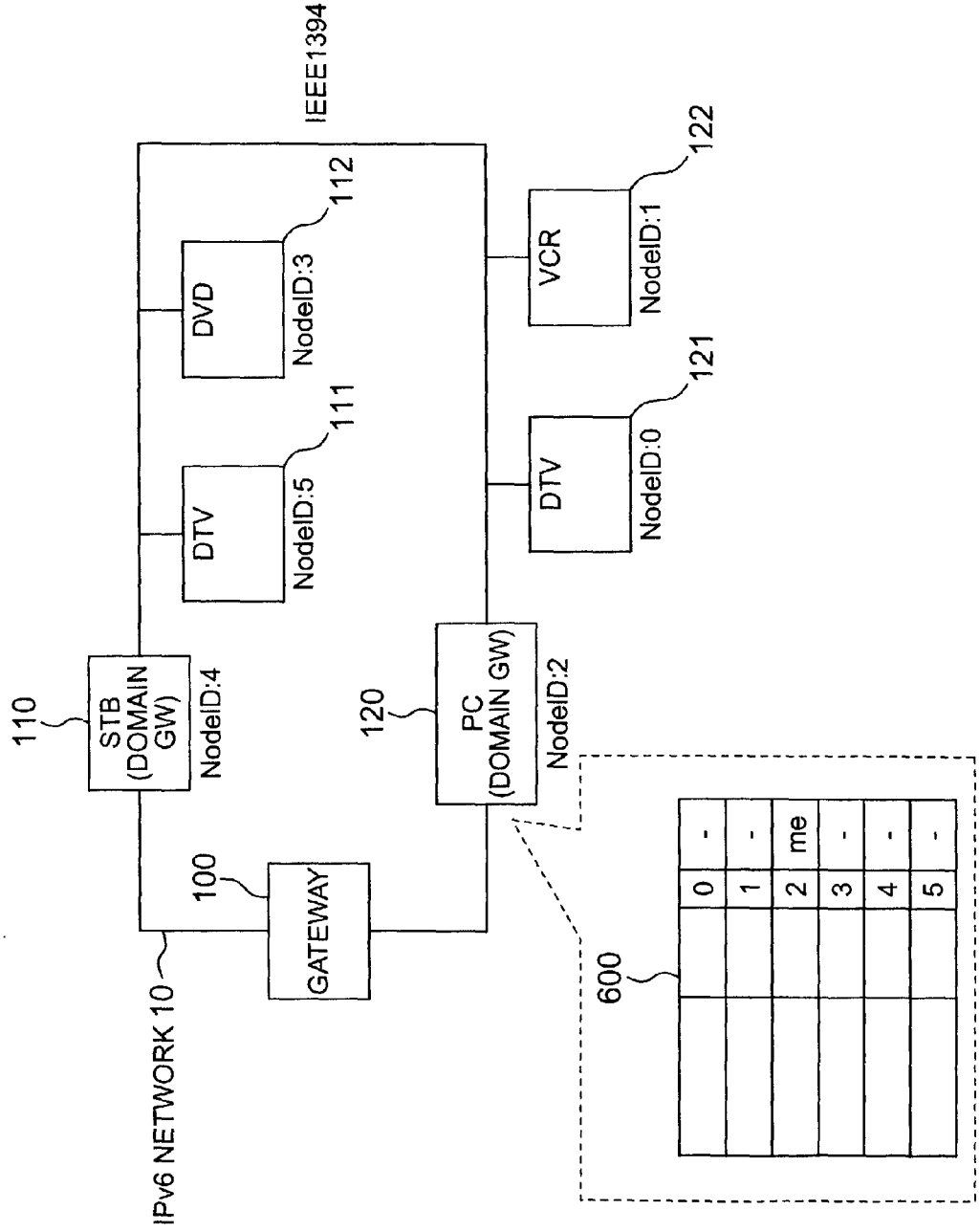
FIG. 14 is a diagram showing that PC, which is a domain GW, administers IP addresses of all devices on a 1394 bus including STB, which is another domain GW, according to an embodiment of the present invention.

When devices on two different 1394 networks are connected to form one 1394 network, the procedure heretofore described causes either the STB 110 or the PC 120 (PC 120 in FIG. 14) to take charge of administering the address translation table for devices on the 1394 network, and causes the address translation table of either the STB 110 or the PC 120 (STB 110 in FIG. 14) to become invalid as shown in FIG. 14.

In FIG. 14, the PC 120 includes an IP address (XXXX:0:0:0:0288:99aa:bbcc:ddee) of the STB 110 in the address translation table 600. If the STB 110 has received a message containing the IP address from a device on the IP network, therefore, the STB 110 does not transmit a response message because the address translation table 500 is invalid as described with reference to FIG. 13. That is, if a device on the IP network has transmitted data to the STB 110 by using the IP address, then the IP packet is translated to a 1394 packet by the format translation section 409 of the PC 120 and then the 1394 packet is sent onto the 1394 bus and received by the STB 110 via the 1394 processing section 408. By the way, the STB 110 can directly receive a message containing the MAC-IP address of the STB 110 transmitted a device on the IP network.

Figure 15:
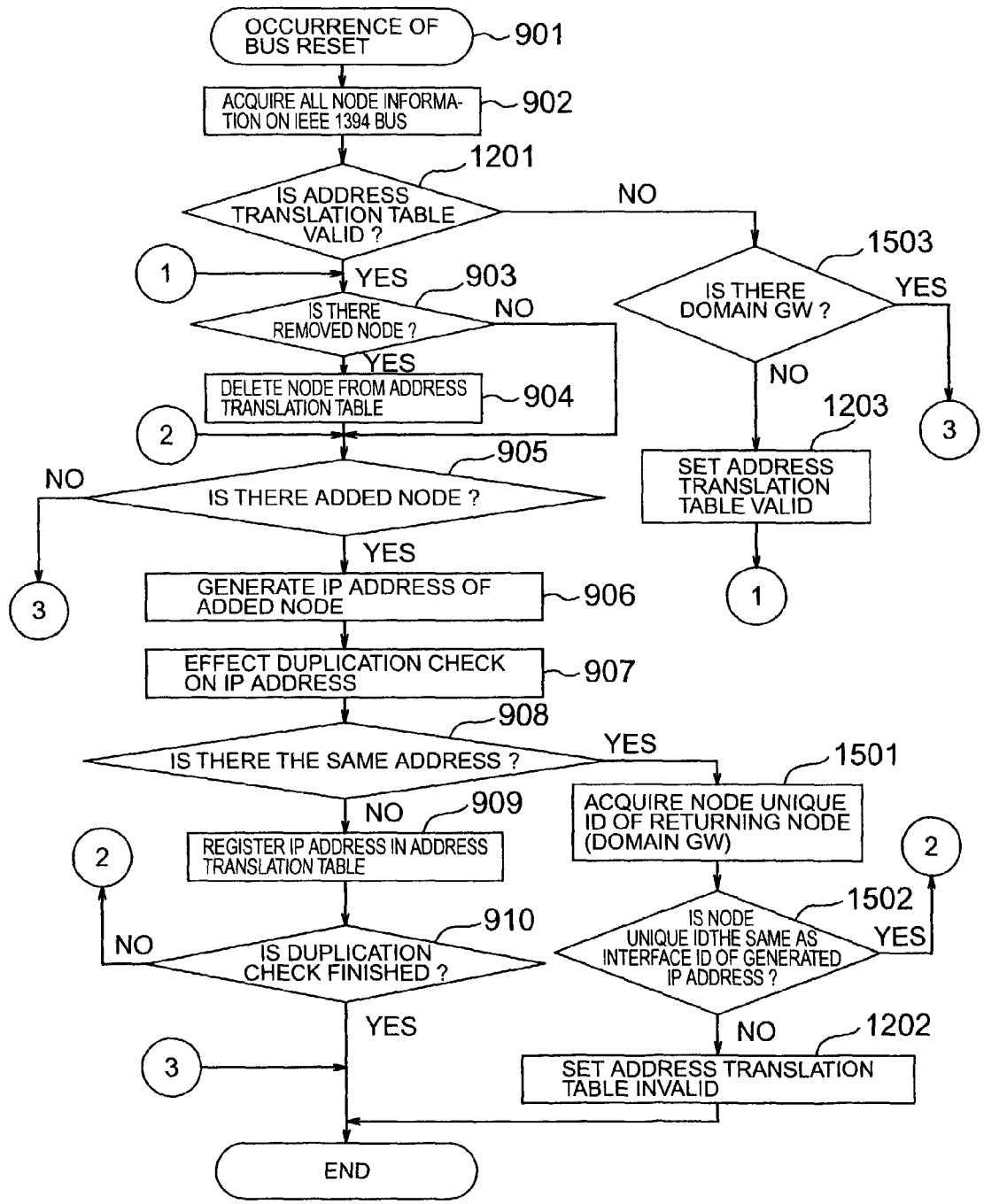
FIG. 15 is a sequence diagram showing a procedure whereby a domain GW assigns an IP address to a device on a 1394 bus, according to an embodiment of the present invention.

As a third method, an update procedure of the address translation table in the gateway apparatus is shown in FIG. 15. As an example, operation of the STB 110 will now be described.

First, processing similar to that of the steps 901 to 908 of FIG. 12, which is the second method, is conducted. At step 907, multi-cast transmission of a duplication confirmation message including the generated IP address to devices on the IP network is conducted. If as a result a response to the message is returned from another device on the IP network at the step 908, then the address check section 413 transmits a message for inquiring the unique ID of the device that returned the response to the device, i.e., the gateway apparatus connected to both the 1394 network and the IP network, via the IP network processing section 408 (step 1501). The unique ID returned from the gateway apparatus is compared with lower 64 bits (interface ID) of the generated IP address (step 1502). If as a result the unique ID of the gateway apparatus is the same as the interface ID of the generated IP address, then registration in the address translation table 500 is not conducted, and the processing returns to a check of a subsequently added device (step 905). On the other hand, if the unique ID of the gateway apparatus is different from the interface ID of the generated IP address, the address check section 413 stores the unique ID of the gateway apparatus, orders the address translation table storage section 414 to set the address translation table 500 invalid (step 1202), and the processing is finished.

If occurrence of a bus reset is subsequently sensed, the processing is started from the step 901 again. At the step 1201, the address check section 413 effects a check to determine whether the address translation table 500 of the address translation table storage section 414 is valid at the present time. If as a result it is found that the address translation table 500 is set invalid, the address check section 413 effects a check to determine whether the gateway apparatus stored at the step 1202 exists on the 1394 network (step 1503). If as a result the gateway apparatus exists on the 1394 network, the processing is finished. If the gateway apparatus does not exist, then the address translation table storage section 414 is ordered to set the address translation table 500 valid (step 1203), and the processing of the step 903 and the steps subsequent thereto is conducted.

Figure 16:
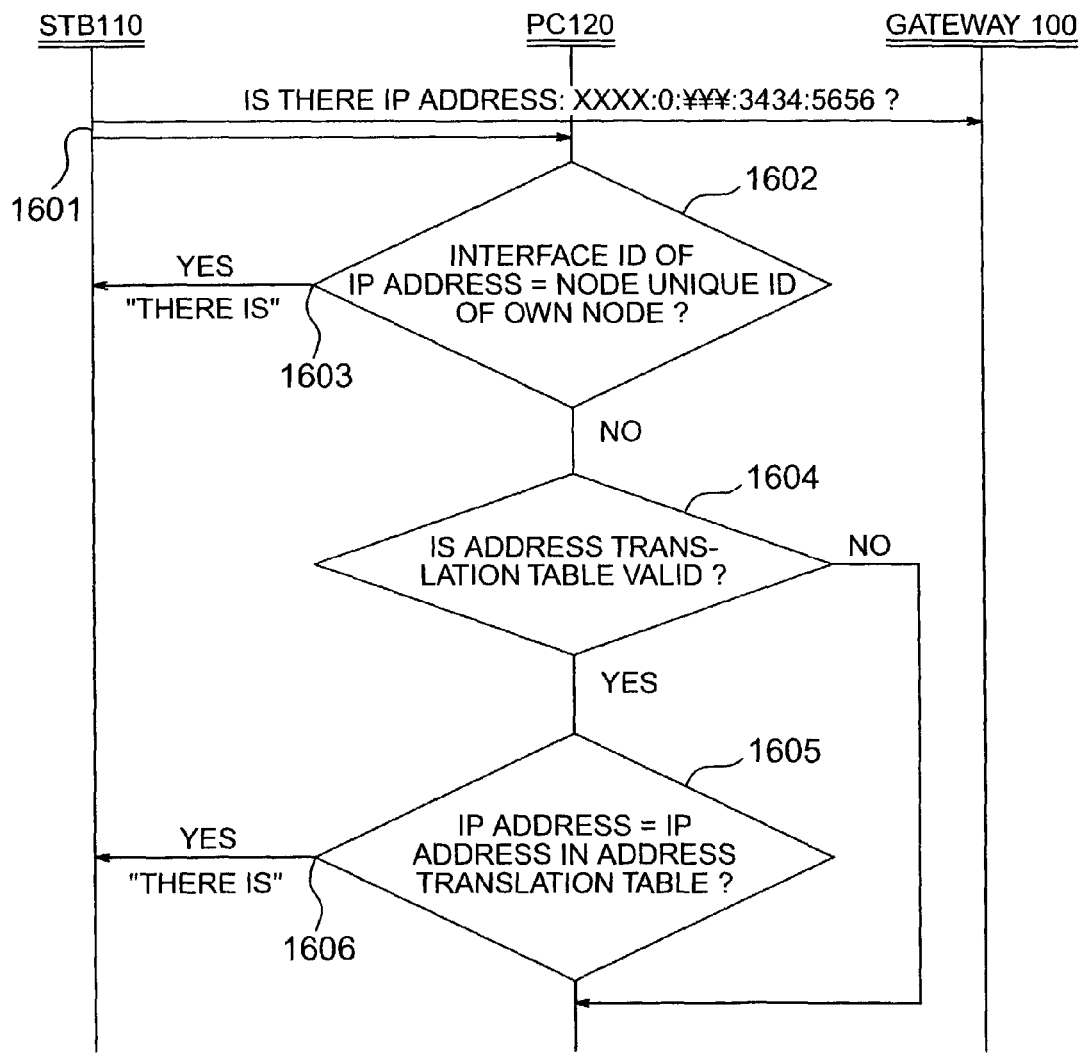
FIG. 16 is a sequence diagram showing a procedure whereby a domain GW effects a duplication check on an IP address, according to an embodiment of the present invention.
Figure 17:
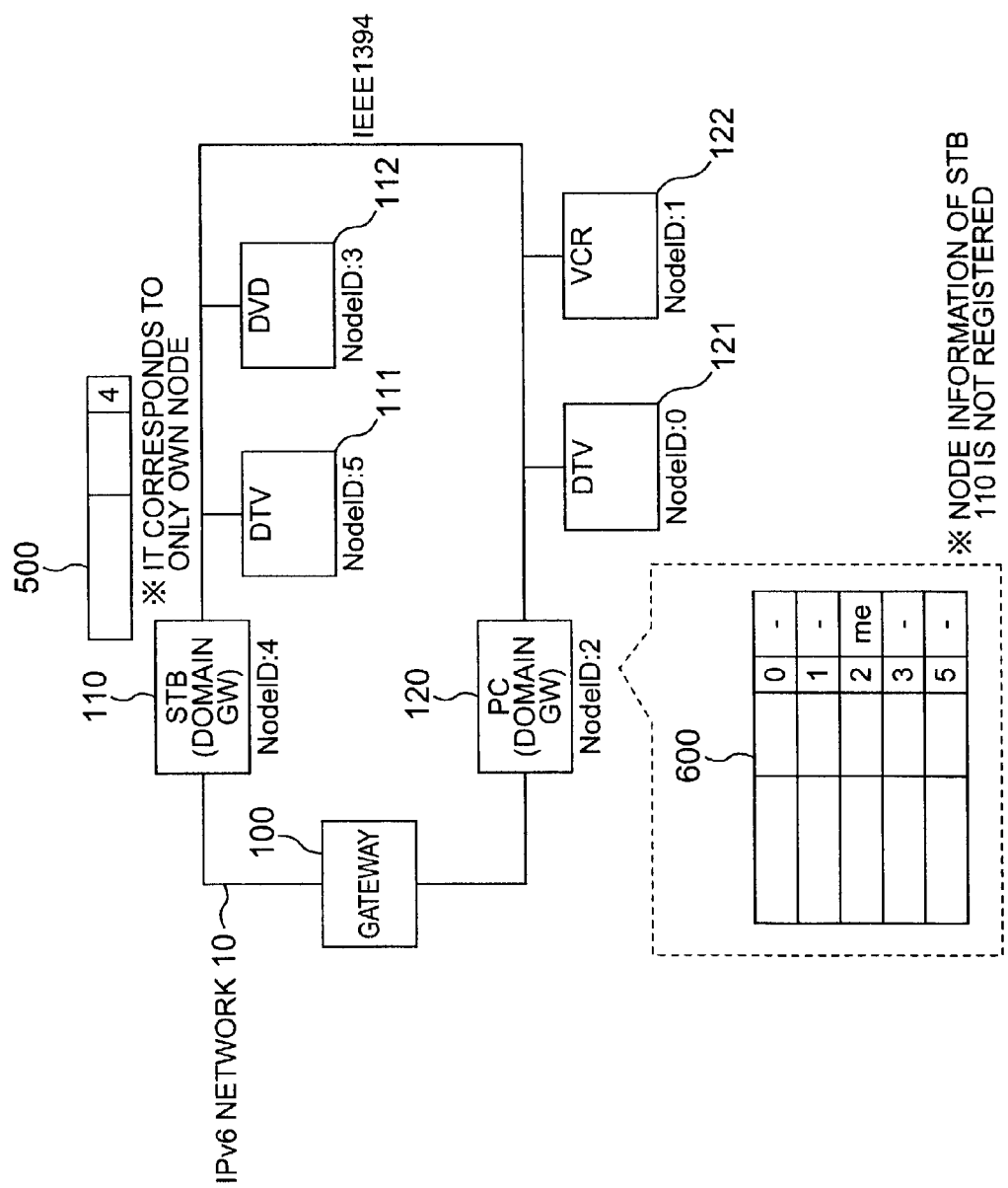
FIG. 17 is a diagram showing that PC, which is a domain GW, administers IP addresses of devices on a 1394 bus except STB, which is another domain GW, according to an embodiment of the present invention.

FIG. 16 shows a procedure whereby a device on the IP network responds to the message multi-cast at the step 907.

First, the STB 110 transmits a message containing a generated IP address to the PC 120 and the gateway 100 (step 1601). The PC 120 receives the message via the IP network processing section 406, and notifies the TCP/IP processing section 405 of contents of the message. The TCP/IP processing section 405 extracts lower 64 bits (for example, 0200:1212:3434:5656) of the received IP address, which represent the interface ID, and notifies the address check section 413 of the interface ID. The address check section 413 compares the interface ID of the received IP address with the unique ID of the own device, and effects a check to determine whether they are the same exclusive of the seventh most significant bit (step 1602). If as a result equality is found, then the TCP/IP processing section 405 is notified of the equality, and a return message for the message is generated and transmitted to the STB 110 via the IP network processing section 406 (step 1603). On the other hand, if the interface ID is not equal to the own unique ID, then the address translation table storage section is inquired of whether the address translation table 500 is valid at the present time (step 1604). If the address translation table 500 is invalid, the processing is finished. Only when the address translation table is valid, the address check section 413 reads out the address translation table 600 from the address translation table storage section 414, and effects a check to determine whether device information having the unique ID as the interface ID exists in the address translation table 600 (step 1605). If a device having the same unique ID exists, then notice to the effect is given to the TCP/IP processing section 405, and a return message for the message is generated and transmitted to the STB 110 via the IP network processing section 406 (step 1606). If the same unique ID does not exist in the address translation table 600, then nothing is conducted and the processing is finished.

When devices on two different 1394 networks are connected to form one 1394 network, the procedure heretofore described causes the STB 110 to take charge of administering the IP address of only the own device and causes the PC 120 to take charge of administering the address translation table 600 for other devices on the 1394 network.

There is also conceivable a configuration in which IP addresses of the STB 110 itself and the PC 120 itself are not included in the address translation table 500 administered by the STB 110 and the address translation table 600 administered by the PC 120.

Furthermore, there is also conceivable a method of omitting the step 1503 and conducting only processing of the step 1504 if a check is effected to determine whether the address translation table 500 is valid at step 1201 of FIG. 15 and consequently the address translation table 500 is found to be set invalid. Furthermore, there is also conceivable a method of acquiring a node ID instead of a unique ID for another gateway apparatus at step 1501.

Figure 18:
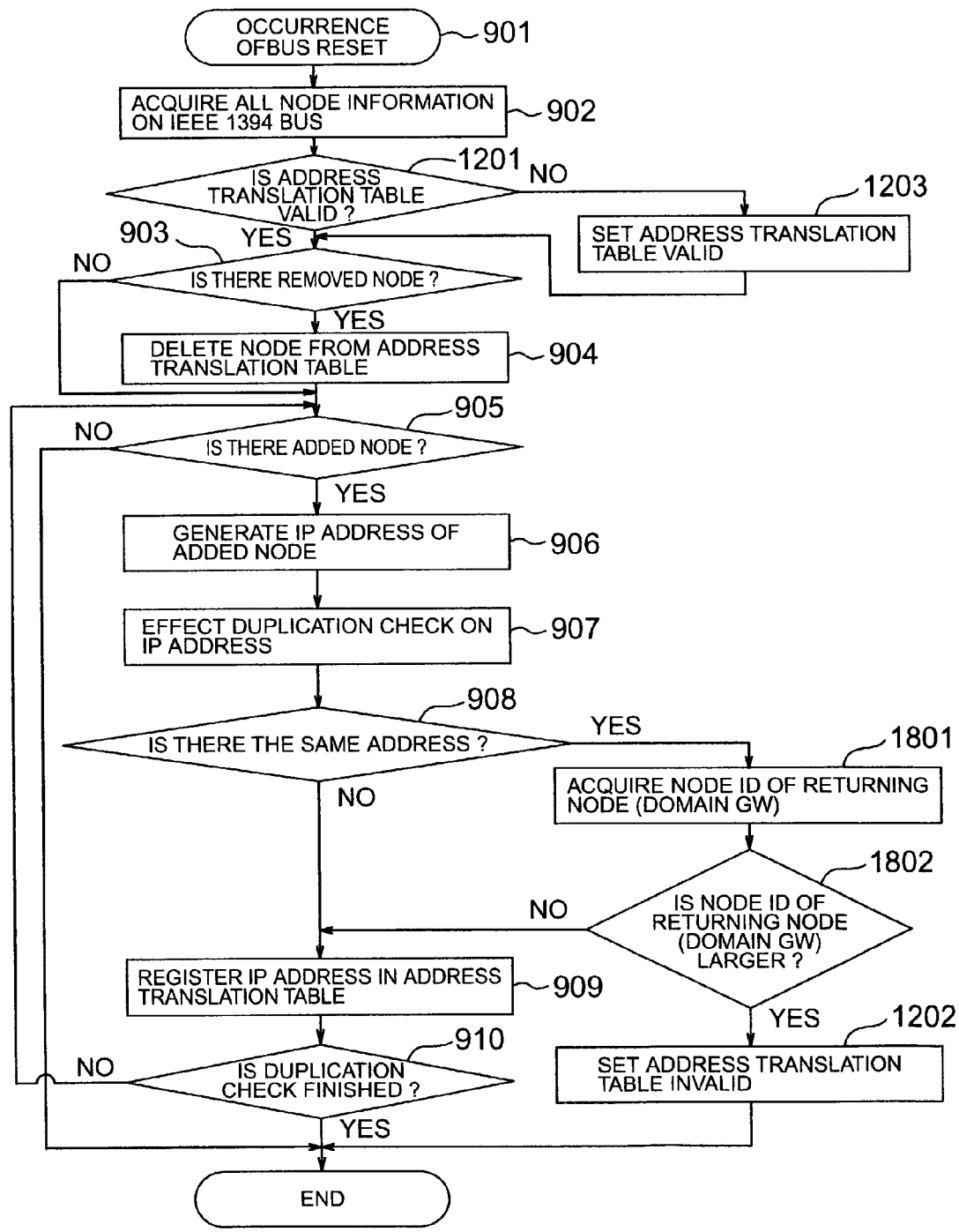
FIG. 18 is a sequence diagram showing a procedure whereby a domain GW assigns an IP address to a device on a 1394 bus, according to an embodiment of the present invention.

As a fourth method, an update procedure of the address translation table in the gateway apparatus is shown in FIG. 18. As an example, operation of the STB 110 will now be described.

Operation of FIG. 18 differs from the operation of FIG. 15 in processing of the step 908 and subsequent steps.

First, if as a result a response to the message is returned from another device on the IP network at the step 908, then the address check section 413 transmits a message for inquiring the unique ID of the device that returned the response to the device, i.e., the gateway apparatus connected to both the 1394 network and the IP network, via the IP network processing section 408 (step 1801). Upon receiving a message containing a node ID from the gateway apparatus, the address check section 413 compares the magnitude of that node with the magnitude of the node ID of the own device (step 1802). If as a result the node ID of the own device is smaller, then the address check section 413 orders the address translation table storage section 414 to set the address translation table 500 invalid (step 1202), and the processing is finished. On the other hand, if the node ID of the own device is larger, then the address check section 413 registers the generated IP address in the address translation table 500 (step 909).

When devices on two different 1394 networks are connected to form one 1394 network, the procedure heretofore described causes either the STB 110 or the PC 120 having a larger node ID to take charge of administering the address translation table 600 for other devices on the 1394 network.

There is also conceivable a configuration in which IP addresses of the STB 110 itself and the PC 120 itself are not included in the address translation table 500 administered by the STB 110 and the address translation table 600 administered by the PC 120.

Furthermore, there is a method of effecting a check to determine whether the address translation table 500 is valid at the step 1201 of FIG. 18 and executing the step 1203 of FIG. 12 if the address translation table 500 is set invalid. Or there is a method of executing the step 1203 after execution of the step 1503 of FIG. 15. Furthermore, there is also conceivable a method of acquiring a unique ID of the other gateway apparatus instead of a node ID thereof and acquiring the node ID from the unique ID at the step 1801.

At the steps 1801 and 1802, a gateway apparatus having a larger node ID value is determined to become the gateway apparatus that administers addresses of all devices on the 1394 network. However, other determining methods may also be adopted. For example, a gateway apparatus having a smaller node ID value may be determined. Or it is also possible to conduct suitable computation on the basis of the node ID or unique ID and determine the gateway apparatus that administers addresses of all devices on the 1394 network according to whether the result is large or small.

Figure 19:
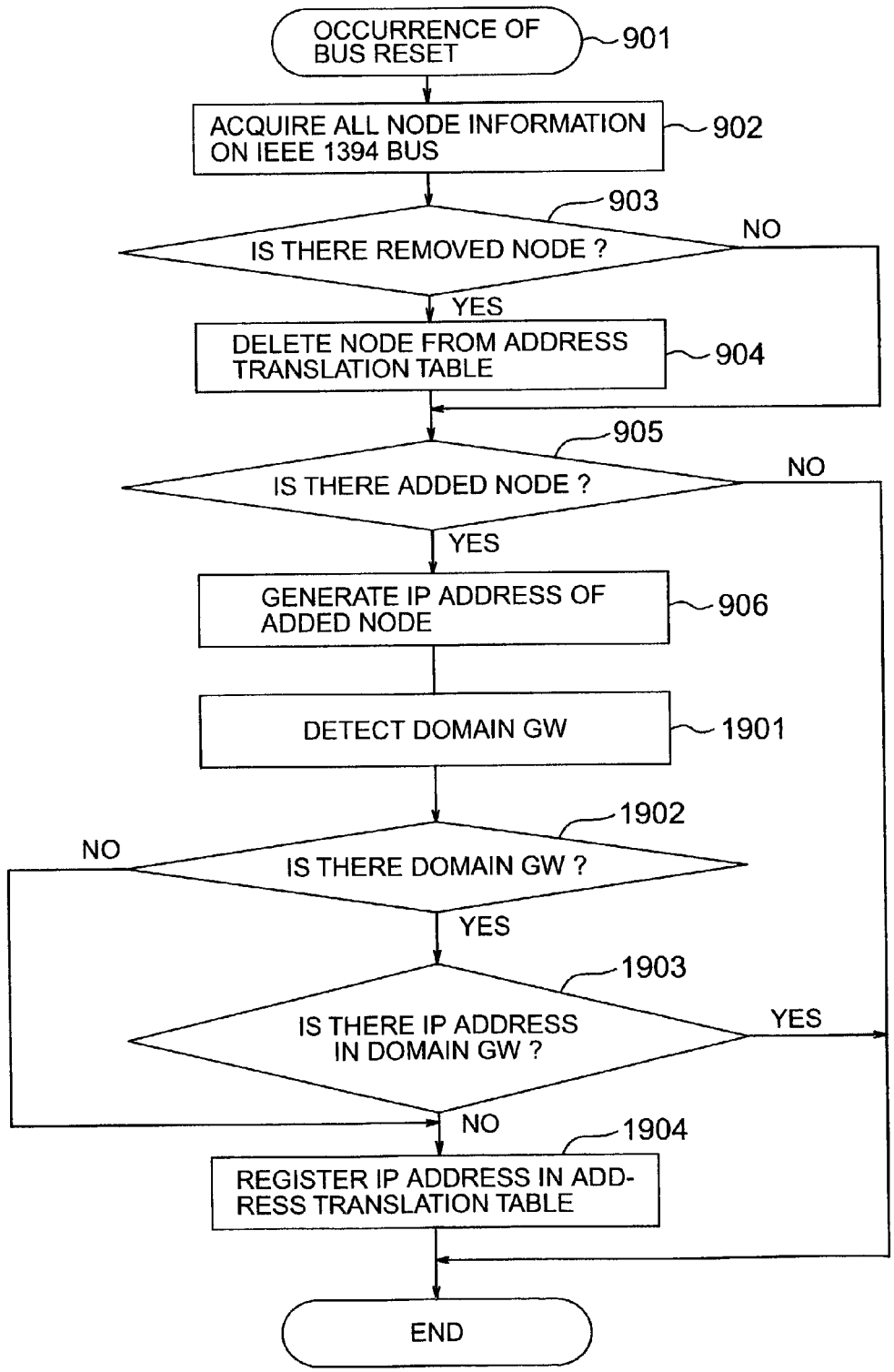
FIG. 19 is a sequence diagram showing a procedure whereby a domain GW assigns an IP address to a device on a 1394 bus, according to an embodiment of the present invention.

As a fifth method, an update procedure of the address translation table in the gateway apparatus is shown in FIG. 19. As an example, operation of the STB 110 will now be described.

First, processing similar to that of the steps 901 to 906 of FIG. 9, which is the first method, is conducted. If the address generation section 412 generates an IP address for a newly added device at the step 906, then the address check section 413 orders the AV protocol processing section 407 to effect detection to determine whether a gateway apparatus having an address translation table exists on the 1394 network. The AV protocol processing section 407 transmits a message for inquiring of a device on the 1394 network whether the device has a function of serving as a gateway apparatus, via the 1394 processing section 408 by utilizing an AV/C digital interface command set (step 1901), and effects a check to determine whether a gateway apparatus exists (step 1902). If as a result a gateway apparatus exists on the 1394 network, then the AV protocol processing section 407 transmits a message for inquiring of the gateway apparatus whether the gateway apparatus is administering the generated IP address, to the gateway apparatus via the 1394 processing section 408 (step 1903). If as a result the gateway apparatus is administering the IP address, then the processing is finished. If the gateway apparatus is not administering the IP address, then the IP address is registered in the address translation table 500 (step 1904). On the other hand, if a gateway apparatus does not exist on the 1394 network, then the IP address is registered in the address translation table 500 (step 1904).

When devices on two different 1394 networks are connected to form one 1394 network, the procedure heretofore described causes the STB 110 to have addresses concerning the DTV 111 and the DVD recorder 112 in the address translation table 500 and causes the PC 120 to have addresses concerning the DTV 121 and the VTR 122 in the address translation table 600. It is thus prevented to assign an IP address to devices on the 1394 network in duplication.

There is also a method of previously storing information for indicating that a gateway apparatus is a gateway apparatus having an address translation table, in a configuration ROM or a predetermined address space, and acquiring this information with a read transaction at the step 1901. Furthermore, there is also conceivable a method of creating in the TCP/IP processing section 405 a packet for inquiring of a device on the IP network whether the device is a gateway apparatus having an address translation table, instead of the AV/C digital interface command set, and acquiring a response via the IP network processing section 406.

Furthermore, there is also a method of terminating the processing if a gateway apparatus exists in devices newly added at the step 1902.

Figure 20:
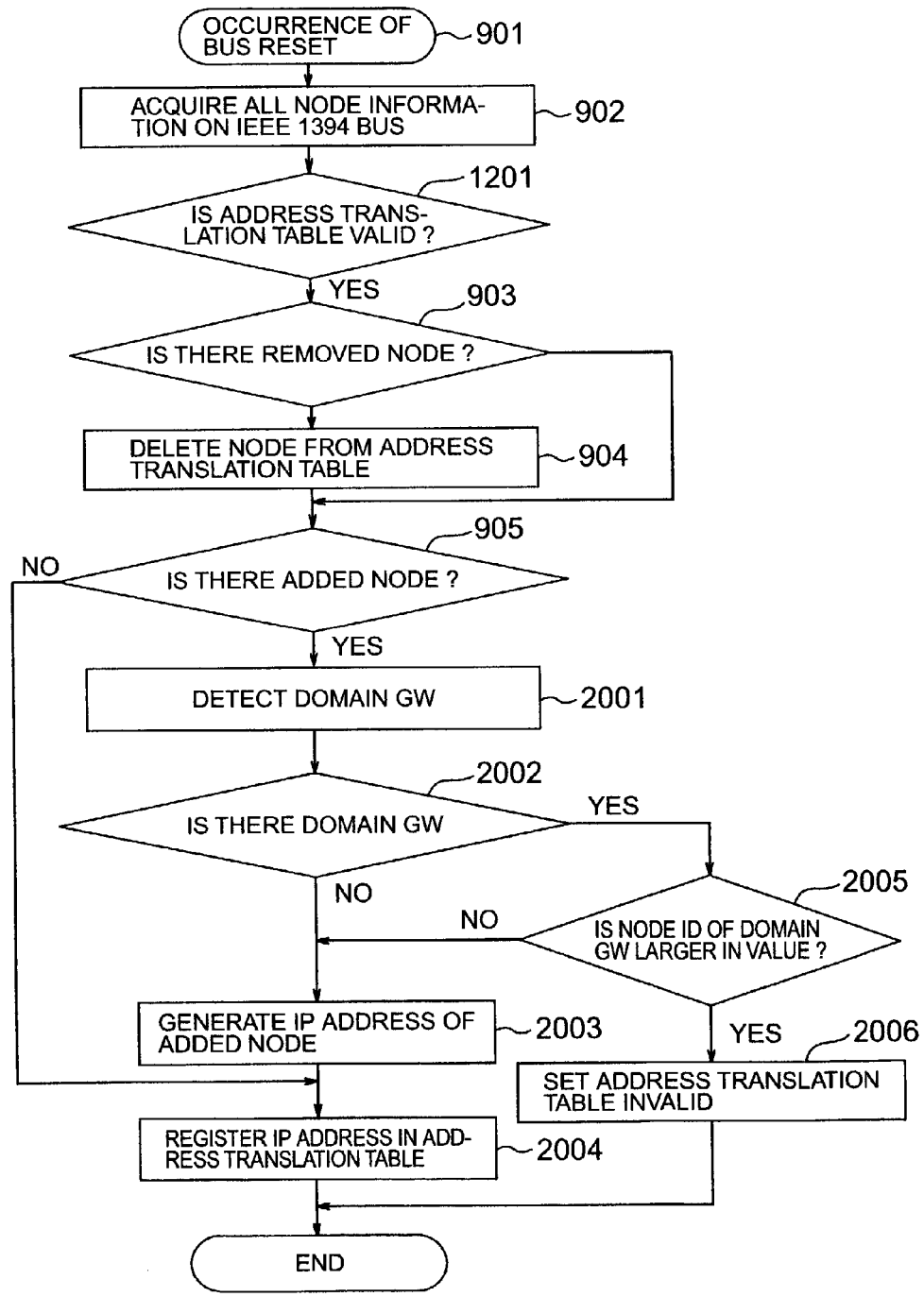
FIG. 20 is a sequence diagram showing a procedure whereby a domain GW assigns an IP address to a device on a 1394 bus, according to an embodiment of the present invention.

As a sixth method, an update procedure of an address translation table in a gateway apparatus is shown in FIG. 20. As an example, operation of the STB 110 will now be described.

First, processing similar to that of the steps 901 to 905 of FIG. 18, which is the fourth method, is conducted. Subsequently, if a newly added device has been detected at the step 905, then the address check section 413 orders the AV protocol processing section 407 to effect detection to determine whether a gateway apparatus having an address translation table exists on the 1394 network. The AV protocol processing section 407 transmits a message for inquiring of a device on the 1394 network whether the device has a function of serving as a gateway apparatus, via the 1394 processing section 408 by utilizing an AV/C digital interface command set (step 2001), and effects a check to determine whether a gateway apparatus exists (step 2002). If as a result a gateway apparatus does not exist on the 1394 network, then an IP address is generated on the basis of a unique ID of the added device (step 2003), and registered in the address translation table 500 (step 2004).

On the other hand, if a gateway apparatus exists at the step 2002, then a node ID of the gateway apparatus is compared with a node ID of the own device (step 2005). If the node ID of the own device is larger, the processing proceeds to processing to the step 2003. If the node ID of the own device is smaller, the address translation table 500 is set invalid (step 2006).

When devices on two different 1394 networks are connected to form one 1394 network, the procedure heretofore described causes either the STB 110 or the PC 120 having a larger node ID to take charge of administering the address translation table 600 for other devices on the 1394 network. At the steps 2005 and 2006, a gateway apparatus having a larger node ID value is determined to become the gateway apparatus that administers addresses of all devices on the 1394 network. However, other determining methods may also be adopted. For example, a gateway apparatus having a smaller node ID value may be determined. Or it is also possible to conduct suitable computation on the basis of the node ID or unique ID and determine the gateway apparatus that administers addresses of all devices on the 1394 network according to whether the result is large or small.

In a system in which two or more gateway apparatuses exist on an IP network and a 1394 network exists for each gateway apparatus, a gateway apparatus according to an embodiment of the present invention can assign IP addresses to devices existing on the 1394 network without duplication and prevent path duplication as heretofore described.

In a system in which two or more gateway apparatuses exist on an IP network and a 1394 network exists for each gateway apparatus, a gateway apparatus according to the present invention can assign IP addresses to devices existing on the 1394 network without duplication and prevent path duplication. Therefore, problems, such as a collision between data transmitted from devices on the IP network to devices on the 1394 network or communication of useless packets caused by duplication of a path, can be avoided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A gateway apparatus for coupling a first network and a second network respectively having mutually different address systems and implementing data exchange between devices respectively connected to the first network and the second network, said gateway apparatus comprising:

an address administration table for indicating association between network addresses represented in a first network form and network addresses represented in a second network form;

address update means for updating contents of said address administration table;

device configuration detection means for detecting that a device configuration on the second network has changed;

device information acquisition means for acquiring information concerning devices on the second network;

address generation means for generating a network address represented in the first network form, based on information concerning the devices acquired by said device information acquisition means, wherein if a change of a device configuration on the second network is detected by said device configuration detection means, then said gateway apparatus generates a device address in said address generation means;

means for inquiring whether another gateway apparatus connected to the first network is administering an address identical to the address generated by the address generation means, and responsive to existence of another gateway apparatus administering the identical address, for conducting processing so as not to register the generated address in said address administration table.

2. The gateway apparatus according to claim 1, wherein if another gateway apparatus that is administering an address identical to a translated and generated device address exists, processing is conducted so as to prevent the generated address from being registered in said address administration table and prevent duplication of a device address.

3. The gateway apparatus according to claim 1, comprising means for notifying a user that there is address duplication, by means of a speech, a text, or an image.

4. The gateway apparatus according to claim 1, wherein the first network is an IP network in which addresses are specified by IP addresses, and the second network is a network formed of apparatuses connected by IEEE 1394 interfaces.

5. A gateway apparatus for coupling a first network and a second network respectively having mutually different address systems and implementing data exchange between devices respectively connected to the first network and the second network, said gateway apparatus comprising:

an address administration table for indicating association between network addresses represented in a first network form and network addresses represented in a second network form; and means responsive to a change of a device configuration on the second network, for inquiring whether another gateway apparatus connected to the first network is administering an address identical to an address generated by translation of an address in the second network form to produce an address in the first network form, responsive to existence of another gateway apparatus administering the identical address, for conducting adjustment as to which of the own gateway apparatus and the another gateway apparatus should conduct administration, and responsive to a decision that the own gateway apparatus should administer the address, for registering the generated address in said address administration table.

6. A gateway apparatus for coupling a first network and a second network respectively having mutually different address systems and implementing data exchange between devices respectively connected to the first network and the second network, said gateway apparatus comprising:

address administration means having an address administration table for indicating association between network addresses represented in a first network form and network addresses represented in a second network form;

data communication means for translating an address in the first network form to produce an address in the second network form or translating an address in the second network form to produce an address in the first network form in accordance with said address administration table, and conducting data communication between a device on the first network and a device on the second network;

address update means for updating contents of said address administration table;

device configuration detection means for detecting that a device configuration on the second network has changed;

device information acquisition means for acquiring information concerning devices on the second network;

address generation means for generating a network address represented in the first network form, based on information concerning the devices acquired by said device information acquisition means; and address adjustment means for effecting adjustment so as to prevent duplication of addresses administered in said address administration table between said gateway apparatus and other gateway apparatuses existing on the first network, wherein if a change of a device configuration on the second network is detected by said device configuration detection means, then said gateway apparatus generates a device address in said address generation means, effects adjustment in said address adjustment means so as to prevent duplication of the generated address between said gateway apparatus and other gateway apparatuses, and registers in said address update means the generated address in said address administration table.

7. A gateway apparatus for coupling a first network and a second network respectively having mutually different address systems and implementing data exchange between devices respectively connected to the first network and the second network, said gateway apparatus comprising:

address administration means having an address administration table for indicating association between network addresses represented in a first network form and network addresses represented in a second network form;

data communication means for translating an address in the first network form to produce an address in the second network form or translating an address in the second network form to produce an address in the first network form in accordance with said address administration table, and conducting data communication between a device on the first network and a device on the second network;

address update means for updating contents of said address administration table;

device configuration detection means for detecting that a device configuration on the second network has changed;

device information acquisition means for acquiring information concerning devices on the second network;

address generation means for generating a network address represented in the first network form, based on information concerning the devices acquired by said device information acquisition means; and address adjustment means for effecting adjustment so as to prevent duplication of addresses administered in said address administration table between the own gateway apparatus and other gateway apparatuses existing on the first network and coupled to another second network different from the second network, wherein if a change of a device configuration on the second network is detected by said device configuration detection means, then said gateway apparatus acquires information concerning all devices existing on the second network in said device information acquisition means, compares contents of said address administration table administered by said address administration means with contents of the acquired information, deletes or makes invalid information concerning removed devices, if any, from said address administration table by using said address update means, generates addresses of newly connected devices, if any, in said address generation means, determines in said address adjustment means a gateway apparatus for administering the generated address between the own gateway apparatus and other gateway apparatuses existing on the first network, responds to decision that the own gateway apparatus should administer the generated address by registering in said address update means the generated address in said address administration table, and takes partial charge of administering addresses of devices existing on the second network in cooperation with a plurality of gateway apparatuses so as to prevent duplication of addresses in said address administration table.

8. The gateway apparatus according to claim 7, wherein in order to make sure that there is no duplication of an address generated in said address generation means, said address adjustment means comprises:

means for transmitting information of a duplication check request containing at least the generated address to devices on the first network; and means for receiving a result of a duplication check of the generated address from devices on the first network, and only when it is found that there is no duplication of the generated address as the result of the duplication check, the generated address is registered in said address registration table.

9. The gateway apparatus according to claim 7, wherein in order to effect detection to determine whether another gateway apparatus connected to the first network exists on the second network, said address adjustment means comprises:
   means for acquiring information as to whether a device on the second network has the address administration means;
   means for transmitting information of a duplication check request containing at least the generated address to other devices on the second network, if any; and
   means for receiving a result of a duplication check of the generated address from other devices on the second network, and
   only when it is found that there is no duplication of the generated address as the result of the duplication check, the generated address is registered in said address registration table.

10. The gateway apparatus according to claim 9, wherein if one or more gateway apparatuses connected to the first network exist among devices newly added onto the second network, the generated addresses concerning the newly added devices are not registered in the address administration table.

11. The gateway apparatus according to claim 8, comprising:
   means for receiving the information of a duplication check request from a device on the first network;
   means for effecting a check to determine whether the own gateway apparatus is administering an address identical to an address contained in the information; and
   means for returning a result of a duplication check in response to the duplication check request, and
   wherein if the gateway apparatus is administering the identical address, the gateway apparatus returns a message to the effect, upon receiving the duplication check request.

12. A gateway apparatus for coupling a first network and a second network respectively having mutually different address systems and implementing data exchange between devices respectively connected to the first network and the second network, said gateway apparatus comprising:
   address administration means having an address administration table for indicating association between network addresses represented in a first network form and network addresses represented in a second network form;
   data communication means for translating an address in the first network form to produce an address in the second network form or translating an address in the second network form to produce an address in the first network form in accordance with said address administration table, and conducting data communication between a device on the first network and a device on the second network;
   address update means for updating contents of said address administration table;
   device configuration detection means for detecting that a device configuration on the second network has changed;
   device information acquisition means for acquiring information concerning devices on the second network;
   address generation means for generating a network address represented in the first network form, based on information concerning the devices acquired by said device information acquisition means; and
   address adjustment means for effecting adjustment so as to prevent duplication of addresses administered in said address administration table between said gateway apparatus and other gateway apparatuses existing on the first network and coupled to a second network different from the second network,
   wherein if a change of a device configuration on the second network is detected by said device configuration detection means, then said gateway apparatus acquires information concerning all devices existing on the second network in said device information acquisition means, compares contents of said address administration table administered by said address administration means with contents of the acquired information, deletes or makes invalid information concerning removed devices, if any, from said address administration table by using said address update means, generates addresses of newly connected devices, if any, in said address generation means, determines in said address adjustment means a gateway apparatus for administering addresses of all devices existing on the second network between the own gateway apparatus and other gateway apparatuses existing on the first network, responds to decision that the own gateway apparatus should administer the addresses of all devices by registering in said address update means the generated address in said address administration table, and arbitrary one gateway apparatus administers the addresses of all devices existing on the second network.

13. The gateway apparatus according to claim 12, comprising:
   address translation table use limit means for setting whether said address translation table can be used; and
   address translation table use judgment means for effecting a check to determine whether said address translation table can be used presently,
   wherein said address adjustment means comprises:
   means for transmitting information of a duplication check request containing at least an address generated by said address generation means, to devices on the first network in order to make sure that there is no duplication of the address; and
   means for receiving a duplication check result of the generated address from a device on the first network, and
   if there is no duplication of the generated address according to the duplication check result, the generated address is registered in said address translation table, and
   if there is duplication of the generated address, said address translation table use limit means sets said address translation table invalid.

14. The gateway apparatus according to claim 13, comprising:
   means for receiving the information of a duplication check request from a device on the first network;
   means for effecting a check to determine whether said address translation table can be used by using said address translation table use judgment means;
   means for effecting a check to determine whether the own gateway apparatus is administering an address identical to an address contained in the information; and means for returning a result of a duplication check in response to the duplication check request, and wherein if said address translation table can be used and the gateway apparatus is administering the identical address, the gateway apparatus returns a message to the effect, upon receiving the duplication check request.

15. The gateway apparatus according to claim 13, wherein said address adjustment means comprises:
    means for transmitting an acquisition request of information concerning a network address in a form of a second network, to devices on the first network; and
    means for receiving information containing the network address from the devices, and
    wherein if the duplication check result indicates duplication, said gateway apparatus acquires information concerning a network address of a device that has transmitted the duplication check result represented in the second network form, and compares the network address with an address generated by said address generation means, and
    if the network address is different from the address generated by said address generation means, said address translation table limit means sets said address translation table invalid.

16. The gateway apparatus according to claim 15, comprising:
    means for receiving the information of a duplication check request from a device on the first network;
    means for effecting a check to determine whether said address translation table can be used by using said address translation table use judgment means;
    means for effecting a check to determine whether the own gateway apparatus is administering an address identical to an address contained in the information; and
    means for returning a result of a duplication check in response to the duplication check request, and
    wherein upon receiving the duplication check request, a check is effected to determine whether an address contained in the request is identical to a network address of the own gateway apparatus in the second network form,
    if the address contained in the request is identical to the network address of the own gateway apparatus, a message to that effect is returned, and
    if the address contained in the request is different from the network address of the own gateway apparatus, use of said address translation table is possible, and the identical address is administered in said address translation table, a message to that effect is returned.

17. The gateway apparatus according to claim 13, wherein said address adjustment means comprises:
    means for transmitting an acquisition request of information concerning a network address in a form of a second network, to devices on the first network; and
    means for receiving information containing the network address from the devices, and
    wherein if the duplication check result indicates duplication, said gateway apparatus acquires information concerning a network address of a device that has transmitted the duplication check result represented in the second network form, and compares the information with information concerning a network address of the own device represented in the second network form, and
    if a predetermined condition is satisfied, said address translation table limit means sets said address translation table invalid.

18. The gateway apparatus according to claim 12, comprising:
    address translation table use limit means for setting whether said address translation table can be used; and
    address translation table use judgment means for effecting a check to determine whether said address translation table can be used presently,
    wherein in order to effect detection to determine whether another gateway apparatus connected to the first network exists on the second network, said address adjustment means comprises:
    means for acquiring information as to whether a device on the second network has the address administration means; and
    means for transmitting an acquisition request of information concerning a network address in a form of the second network, to devices on the first network; and
    means for receiving information containing the network address from the devices, and
    wherein if one or more other gateway apparatuses exist on the second network, said gateway apparatus acquires information concerning network addresses of the other gateway apparatuses represented in the second network form, and compares the information with information concerning a network address of the own gateway apparatus represented in the second network form, and
    if a value of the own gateway apparatus is smaller, said address translation table limit means sets said address translation table invalid.

19. The gateway apparatus according to claim 13, wherein if said address translation table is set invalid previously when the device configuration on the network has been detected, said address translation table is set valid.

20. The gateway apparatus according to claim 15, comprising means for holding a network address in the second network form acquired from a device on the first network,
    wherein if a change of a device configuration on the second network is detected, said address translation table is set invalid, and
    if a device having a held network address does not exist on the second network, said address translation table is set valid.

21. An address administration method in a gateway apparatus for coupling a first network and a second network respectively having mutually different address systems and implementing data exchange between devices respectively connected to the first network and the second network, said address administration method comprising the steps of:
    referring to an address administration table for indicating association between network addresses represented in a first network form and network addresses represented in a second network form to translate an addressing the first network form to produce an address in the second network form or translate an address in the second network form to produce an address in the first network form, and conducting data communication between a device on the first network and a device on the second network;
    effecting adjustment so as to prevent duplication of addresses administered in said address administration table between the own gateway apparatus and other gateway apparatuses existing on the first network;
    upon detecting that a device configuration on the second network has changed, acquiring information concerning devices existing on the second network;

referring to said address administration table and address administration tables of said other gateway apparatuses; and updating said address administration table so as to prevent duplication of translated addresses on the second network between the own gateway apparatus and other gateway apparatuses.

22. An AV (audio-visual) device having a gateway function for coupling a first network and a second network respectively having mutually different address systems and implementing data exchange between devices respectively connected to the first network and the second network, said AV device comprising:

address administration means having an address administration table for indicating association between network addresses represented in a first network form and network addresses represented in a second network form;

data communication means for translating an address in the first network form to produce an address in the second network form or translating an address in the second network form to produce an address in the first network form in accordance with said address translation table, and conducting data communication between a device on the first network and a device on the second network;

address update means for updating contents of said address administration table;

device configuration detection means for detecting that a device configuration on the second network has changed;

device information acquisition means for acquiring information concerning devices on the second network;

address generation means for generating a network address represented in the first network form, based on information concerning the devices acquired by said device information acquisition means; and address adjustment means for effecting adjustment so as to prevent duplication of addresses administered in said address administration table between said AV device and other gateway apparatuses existing on the first network, wherein if a change of a device configuration on the second network is detected by said device configuration detection means, then said AV device generates a device address in said address generation means, effects adjustment in said address adjustment means so as to prevent duplication of the generated address between said AV device and other gateway apparatuses, and registers in said address update means the generated address in said address administration table.

* * * * *